United States Patent [19]

Chausse et al.

[11] 4,443,747
[45] Apr. 17, 1984

[54] TRANSITIONING BETWEEN MULTIPLE MODES OF INVERTER CONTROL IN A LOAD COMMUTATED INVERTER MOTOR DRIVE

[75] Inventors: B. Paul Chausse, Roanoke; Paul M. Espelage, Salem, both of Va.; David L. Lippitt, Scotia; Leland C. Tupper, Schenectady, both of N.Y.

[73] Assignee: General Electric Company, Salem, Va.

[21] Appl. No.: 364,453

[22] Filed: Apr. 1, 1982

[51] Int. Cl.³ .................................... H02P 1/46
[52] U.S. Cl. .................................... 318/723; 318/809; 318/802
[58] Field of Search .................. 318/720–724, 318/715, 717, 711, 807, 778–779, 798–803, 808–810, 805; 363/49, 58

[56] References Cited

U.S. PATENT DOCUMENTS

| | | | |
|---|---|---|---|
| 3,601,674 | 8/1971 | Dalton et al. | 318/318 |
| 3,697,843 | 10/1972 | Riess | 318/810 X |
| 4,058,738 | 11/1977 | Udvardi-Lakos | 363/49 X |
| 4,090,116 | 5/1978 | Lippitt | 318/345 |
| 4,099,107 | 7/1978 | Eder | 318/721 X |
| 4,159,515 | 6/1979 | Waikowiak | 363/49 X |
| 4,201,936 | 5/1980 | Roumanis | 318/341 |
| 4,230,979 | 10/1980 | Espelage et al. | 318/721 |
| 4,263,557 | 4/1981 | Jarvinen | 318/341 |
| 4,276,505 | 6/1981 | Bose | 318/723 |
| 4,280,085 | 7/1981 | Cutler | 318/807 X |
| 4,399,395 | 8/1983 | Espelage | 363/87 X |

Primary Examiner—B. Dobeck
Assistant Examiner—Patrick Keane
Attorney, Agent, or Firm—Arnold E. Renner

[57] ABSTRACT

The load side converter or inverter in a load commutated inverter motor drive, including a source side AC to DC converter coupled to a DC to AC converter via a DC link circuit, is adapted to have at least three and preferably four modes of operation for bringing an AC motor load, and more particularly a synchronous motor, up to speed. In the preferred embodiment, the first mode constitutes an idle mode wherein the converter thyristors are maintained in a non-conducting state until commanded for normal operation. The second mode constitutes an initial start-up mode which assumes no knowledge of initial rotor position of the motor and simply utilizes a fixed low frequency firing signal to sequentially gate the thyristors using forced commutation to commutate the off-going thyristor. Thirdly, a second type of forced commutation mode is next entered into where the inverter frequency is synchronized to the rotor of the motor by sensing pseudo-flux waveforms until 5% to 10% of rated motor speed is achieved whereupon a fourth mode is entered into which comprises a self-commutation mode utilizing a phase lock loop operation using pseudo-flux wave zero crossings as synchronizing signals.

In the three mode embodiment, the third mode is eliminated and the second mode modified to vary the load side converter frequency on a time basis until reaching some preset value (e.g., five (5) to fifteen (15) percent of motor rated frequency) at which time transition is made to the self-commutation mode.

46 Claims, 18 Drawing Figures

TRANSITIONING BETWEEN MULTIPLE MODES OF INVERTER CONTROL IN A LOAD COMMUTATED INVERTER MOTOR DRIVE

REFERENCE TO MATERIAL

Reference is made to a microfiche appendix which sets forth a computer program listing including that which is applicable to the present invention. Included are 8 microfiche containing a total of 458 frames.

CROSS REFERENCE TO RELATED APPLICATIONS

This application is related to the following related applications which are assigned to the assignee of the present invention and are herein meant to be incorporated by reference:

U.S. Pat. No. 4,399,395 entitled, "Line-to-Line Voltage Reconstruction For Synchronizing Thyristor Power Converter", issued Aug. 16, 1983 in the name of Paul M. Espelage;

U.S. Ser. No. 333,933, entitled, "Flux Feedback Firing Control For A Load Commutated Inverter", filed on Dec. 23, 1981 in the names of David L. Lippitt, et al.;

U.S. Ser. No. 333,928, entitled, "Cross-Tied Current Regulator For Load Commutated Inverter Drives", filed on Dec. 23, 1981 in the names of John D. D'Atre, et al.;

U.S. Ser. No. 322,741, entitled, "Terminal Voltage Limit Regulator For A Load Commutated Inverter", filed on Nov. 19, 1981 in the name of Leland C. Tupper; and U.S. Ser. No. 343,916, entitled, "Current Limiter For A Load Commutated Inverter", filed on Jan. 29, 1982 in the name of Leland C. Tupper.

BACKGROUND OF THE INVENTION

The present invention relates generally to firing circuits for thyristor power conversion systems and more particularly to an improvement for controlling a DC to AC load side converter which supplies power to a synchronous machine from a polyphase alternating current source.

Many circuits and systems are known for controlling the conductivity of controlled rectifiers utilized in various types of converters for supplying electrical power to a load such as an AC motor from a polyphase alternating current (AC) source. The type of rectifier used controls, to some degree, the type of control utilized. However, by far the most common controlled rectifier used today is a thyristor of the silicon controlled rectifier type which becomes conductive with the simultaneous application of a forward bias voltage and a signal applied to its gate electrode and which thereafter remains conductive until the anode current falls below the value required to hold the thyristor in the conductive state.

Whereas motor control systems employing thyristors have been implemented using analog control techniques, a typical example being U.S. Pat. No. 4,230,979, entitled, "Control Current Inverter And Motor Control System", issued to Paul M. Espelage et al., on Oct. 28, 1980, attention has been and is presently being directed to digital types of control techniques, examples of which are disclosed in: U.S. Pat. No. 3,601,674, entitled, "Control System For Firing SCR's In Power Conversion Apparatus", John A. Joslyn et al., which issued on Aug. 24, 1971; U.S. Pat. No. 4,263,557, entitled, "Power Converter Control", which issued to Willard B. Jarvinen on Apr. 21, 1981; and U.S. Pat. No. 4,276,505, entitled, "Microcomputer Based Control Apparatus For A Load-Commutated Inverter Synchronous Machine Drive System", which issued to Bimal K. Bose on June 30, 1981. The teachings of these patents are also intended to be incorporated herein by reference.

In any phase control system utilizing a thyristor bridge converter, whether it be an analog or digital type system, the AC terminal voltage is a prime feedback signal employed for the control of the conductivity of the various thyristors. Typically, the AC phase voltages referred to a fictitious neutral are utilized to develop line-to-line terminal voltages from which synchronizing signals are generated from pseudo-flux waveforms obtained by integrating the line-to-line voltages. In such applications, however, the zero voltage commutation notches appearing in the line-to-line voltages generate flat spots in the integrated output voltage which can occur at the zero crossings which are utilized to form a synchronizing pulse train at six times the line frequency. Where the flat spots occur at the zero crossings, the stability of the phase lock loop can be undesirably affected. In order to overcome this problem, the above cross referenced U.S. Pat. No. 4,399,395 discloses an improved technique for removing the commutation notches by summing the integrated output of the corrupted line-to-line voltages with a signal proportional to the commutating inductance multiplied by a fictitious "delta" current which is derived by taking the difference between the actual line currents in a manner well known to those skilled in the art. The resultant or composite voltages are the primary feedback control signals for synchronizing either a fixed frequency source side converter or a variable frequency load side converter or both.

SUMMARY OF THE INVENTION

It is, therefore, an object of the present invention to provide an improved system for controlling a polyphase power converter.

It is a further object to provide an improved system for controlling a polyphase power converter by providing a multiplicity of operational modes.

It is still a further object of the present invention to provide a system for controlling the transitioning between multiple operating modes of a polyphase thyristor power converter.

It is still another object of the present invention to provide an improved system for transitioning between multiple operating modes of a load side thyristor converter for powering a synchronous motor and bringing it up to speed.

The foregoing and other objects are achieved by a control system primarily for a polyphase load side power DC to AC converter (inverter) utilized to supply power to a synchronous motor. In the preferred embodiment, the load side converter is adapted to provide at least four modes of operation for bringing the motor up to speed. First, there is an idle mode wherein the thyristors are not fired but firing is thereafter enabled providing, however, that no system faults exist and normal operation can proceed. The second mode comprises an initial start-up mode from zero motor speed using forced commutation at a predetermined fixed low frequency, which frequency is proportional to $\sqrt{T/J}$ where T is available starting torque based on field stator current and J is the total rotor and load inertia. Once start-up occurs and pseudo-flux waveforms become available from the motor's back electromotive force (EMF), which appears on the power lines between converter and motor, operation shifts to a third mode wherein forced commutation is still utilized but the converter's operation is synchronized to the pseudo-flux voltage waveforms. This third mode exists in a range up to 5%–10% of rated speed after which the fourth mode is entered into which consists of a self-commutating mode based on a predetermined type of phase lock loop control. The idle mode can exist for a condition where the motor is either stopped (at rest) or coasting. The self-commutation mode, which is the normal running mode, can be entered either from the idle mode if the motor is initially rotating, or from the synchronized forced commutation mode following start up. Once in the self commutation mode, motor control can transition back to forced commutation when the motor speed becomes too slow, or in the event of shut down, the control can transition directly back to the idle mode.

In a modified embodiment of the present invention, the third mode is essentially eliminated while the second mode is expanded. In this modified version, after transition is made from the idle mode to the forced commutation mode, the operational frequency of the load side converter is varied on a time basis to a preset maximum value in the ranges of from approximately five (5) to fifteen (15) percent of motor rated frequency. Upon reaching this preset maximum value, transition is made to the self-commutation mode earlier discussed.

Whereas an analog implementation of the control requires hardware for each of the modes referred to along with means for selecting a desired mode, the present invention is preferably implemented by software included in microcomputer apparatus wherein specific operational routines operate to effect the operational mode employed.

BRIEF DESCRIPTION OF THE DRAWINGS

While the present invention is defined in the claims annexed to and forming a part of this specification, a better understanding can be had by reference to the following description taken in conjunction with the accompanying drawings in which:

FIG. 6 is an operational mode diagram helpful in understanding the subject invention;

DESCRIPTION OF THE PREFERRED EMBODIMENT

Figure 1:
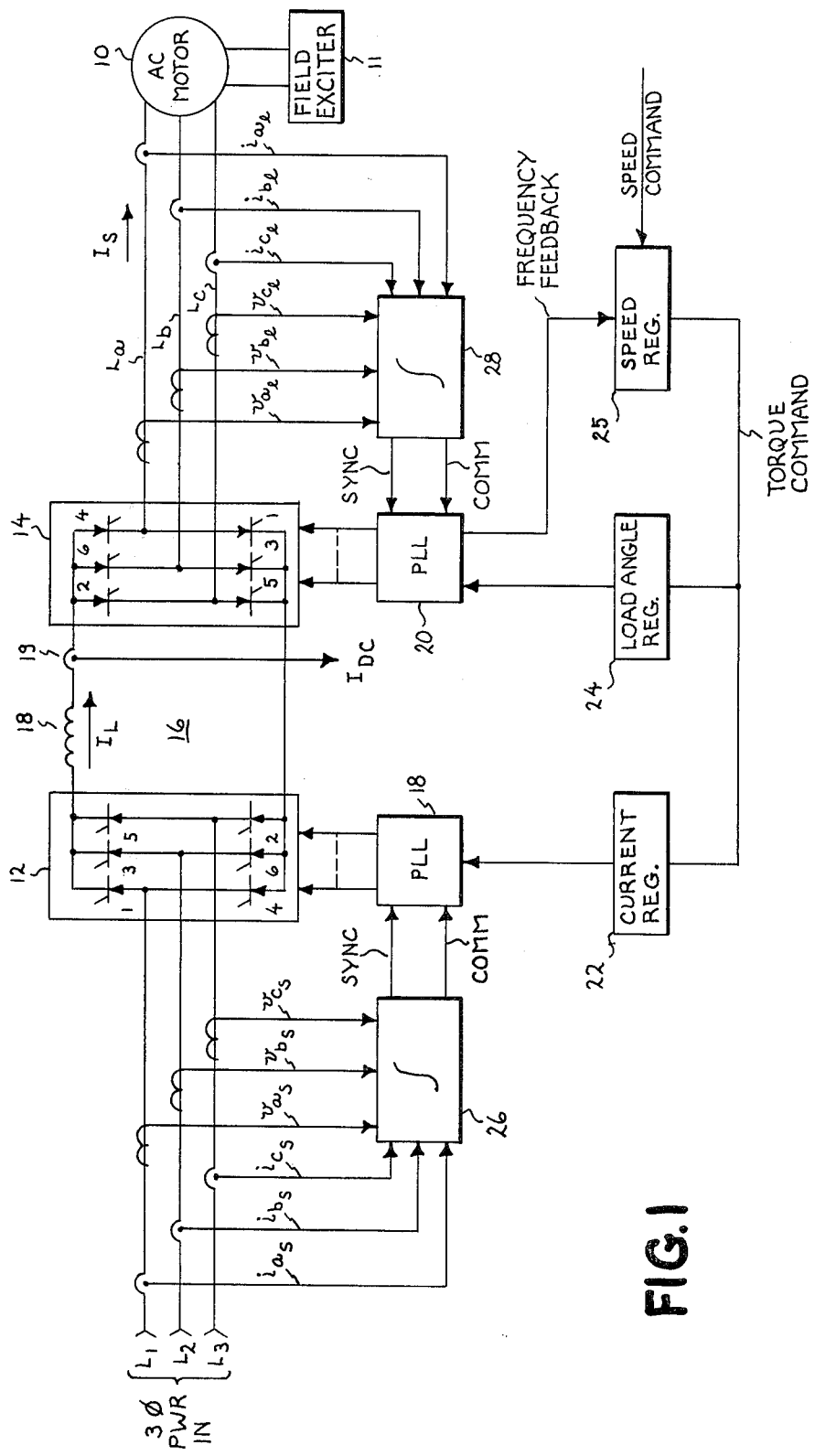
FIG. 1 is a major block diagram illustrative of an AC motor drive system incorporating the present invention.

Considering the overall operation of an AC motor drive system in accordance with the subject invention, reference is now made to FIG. 1 which illustrates in major block diagram form a load commutated inverter motor drive controlling an AC load 10, comprising a synchronous motor, powered from a three phase ($3\phi$) power source, not shown, coupled to the line terminals $L_1$, $L_2$ and $L_3$ in accordance with the operation of a source side AC to DC power converter 12 and a load side DC to AC power converter or inverter 14. An exciter 11 provides motor field excitation. Both converters 12 and 14 include a well known thyristor bridge consisting of at least six thyristors which are fired in the numerical order shown. The source side converter 12 operates to convert the three phase AC power into a source of variable DC current which is coupled by way of a DC link circuit 16 including an inductor 18 to the load side converter 14. The load side converter 14 in turn operates to generate an AC current of variable magnitude and frequency which is supplied to the motor 10 by means of the three phase lines $L_a$, $L_b$ and $L_c$. These basic power components are set forth in greater detail in the aforementioned Bose patent, U.S. Pat. No. 4,276,505.

The thyristor bridge circuits included in the source side converter 12 and the load side converter 14 have their conductivity controlled by means of respective phase lock loop (PLL) firing control circuits 18 and 20. The firing angles of the thyristors in the source side converter 12 are primarily controlled by the output of a current regulator 22 while the firing angles of the thyristors in the load side converter 14 are primarily controlled by the output of the load angle regulator 24. Both regulator circuits operate in accordance with a torque command signal being applied thereto.

The torque command is the output of a speed regulator 25 and comprises a proportional plus integral controller. Because in a synchronous motor the speed is directly proportional to load inverter output frequency, no tachometer is required to drive the speed feedback.

Figure 3:
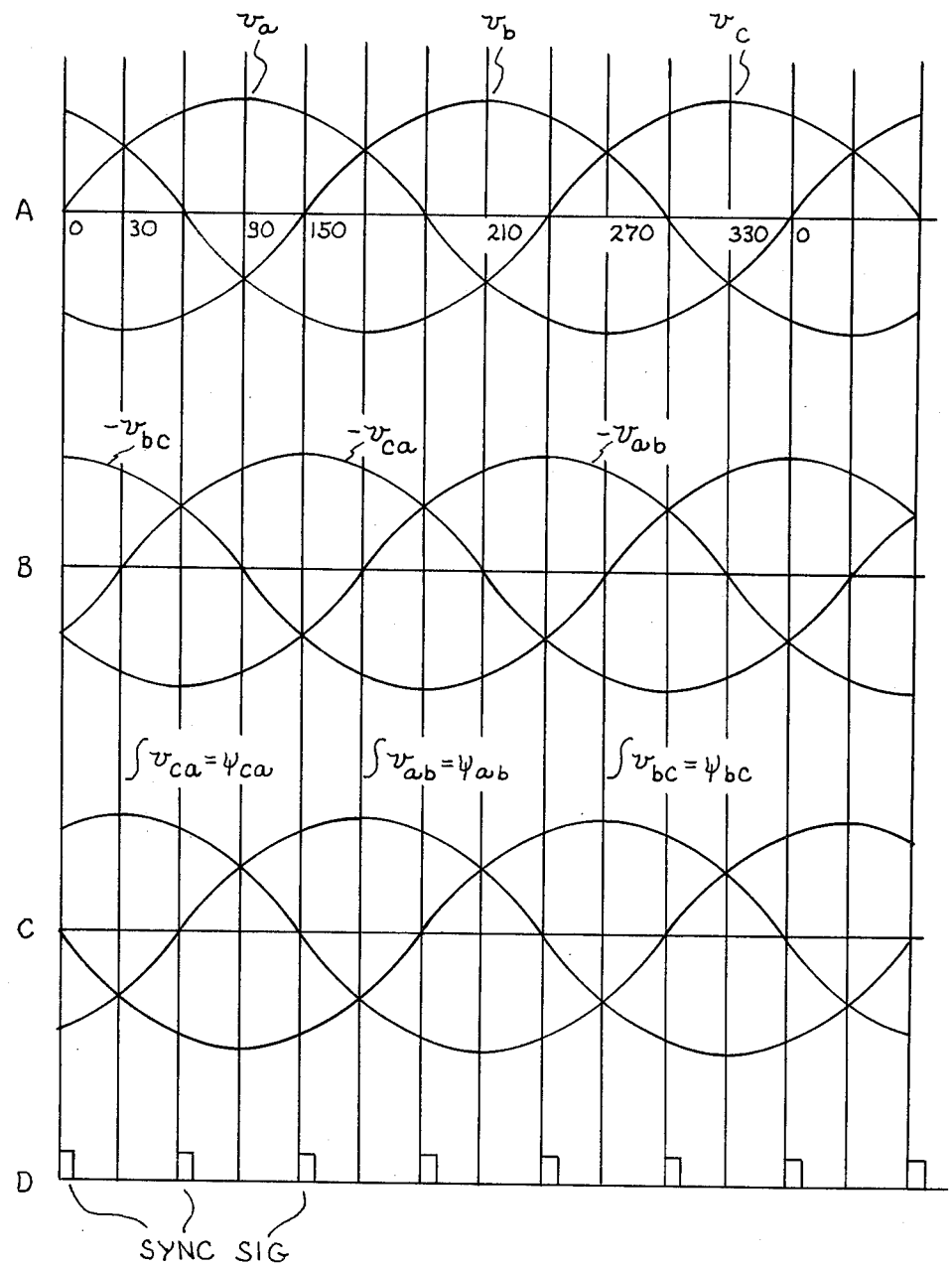
FIG. 3 is a set of time related waveforms helpful in understanding the operation of the subject invention.

A speed feedback signal with the necessary resolution is derived from the phase lock loop counter previously described in patent application Ser. No. 333,933 and shown in FIG. 5. The phase lock loop is synchronized to the six times load frequency derived from the load side flux wave zero crossings. This signal is shown in FIG. 3. A phase lock loop counter 66 shown in FIG. 5 has a crystal controlled (oscillator 74) input clock frequency of 4.9152 MHz. The phase lock loop counter load is the number which when down counted at the clock frequency will produce 512 output pulses from the phase lock loop counter per cycle of motor frequency. This phase lock loop counter load is implemented in a software phase lock loop regulator. The motor speed is obtained by dividing a constant by the phase lock loop counter load (PLLC LOAD); i.e., speed=K/PLLC LOAD.

The firing of the thyristors in the source side converter 12 and the load side converter 14, in two of the operational modes to be described with respect to the latter converter, is respectively synchronized to the three phase-to-neutral or motor load back EMF voltages on the lines $L_1$, $L_2$ and $L_3$ and $L_a$, $L_b$ and $L_c$ by utilizing pseudo-flux waveforms derived from the integration of the line to line voltages which in turn are derived from the phase to neutral voltages. Synchronizing pulse trains are formed from the zero crossings of the pseudo-flux waveforms having a frequency six times the fundamental or line frequency. A preferred form of apparatus utilized for implementing the integration of the line to line voltages is designated by the units 26 and 28 and comprise circuitry shown and described in the above cross referenced U.S. Pat. No. 4,399,395 entitled, "Line-to-Line Voltage Reconstruction For Synchronizing Thyristor Power Converter". Such circuitry operates to reconstruct the line to line voltage waveforms which have become corrupted by commutation notches appearing in the waveforms of the phase voltages during the time each phase current transfers from an outgoing phase to an oncoming phase by the appropriate firing of the individual thyristors. The line to line voltage reconstruction technique consists of a composite waveform developed by summing at least one integrated line to line voltage containing commutation notches with a signal corresponding to at least one "delta" current which is derived from the difference of two phase currents and multiplied by a factor representative of the commutation inductance. This is further shown by the electrical block diagram of FIG. 2.

Figure 2:
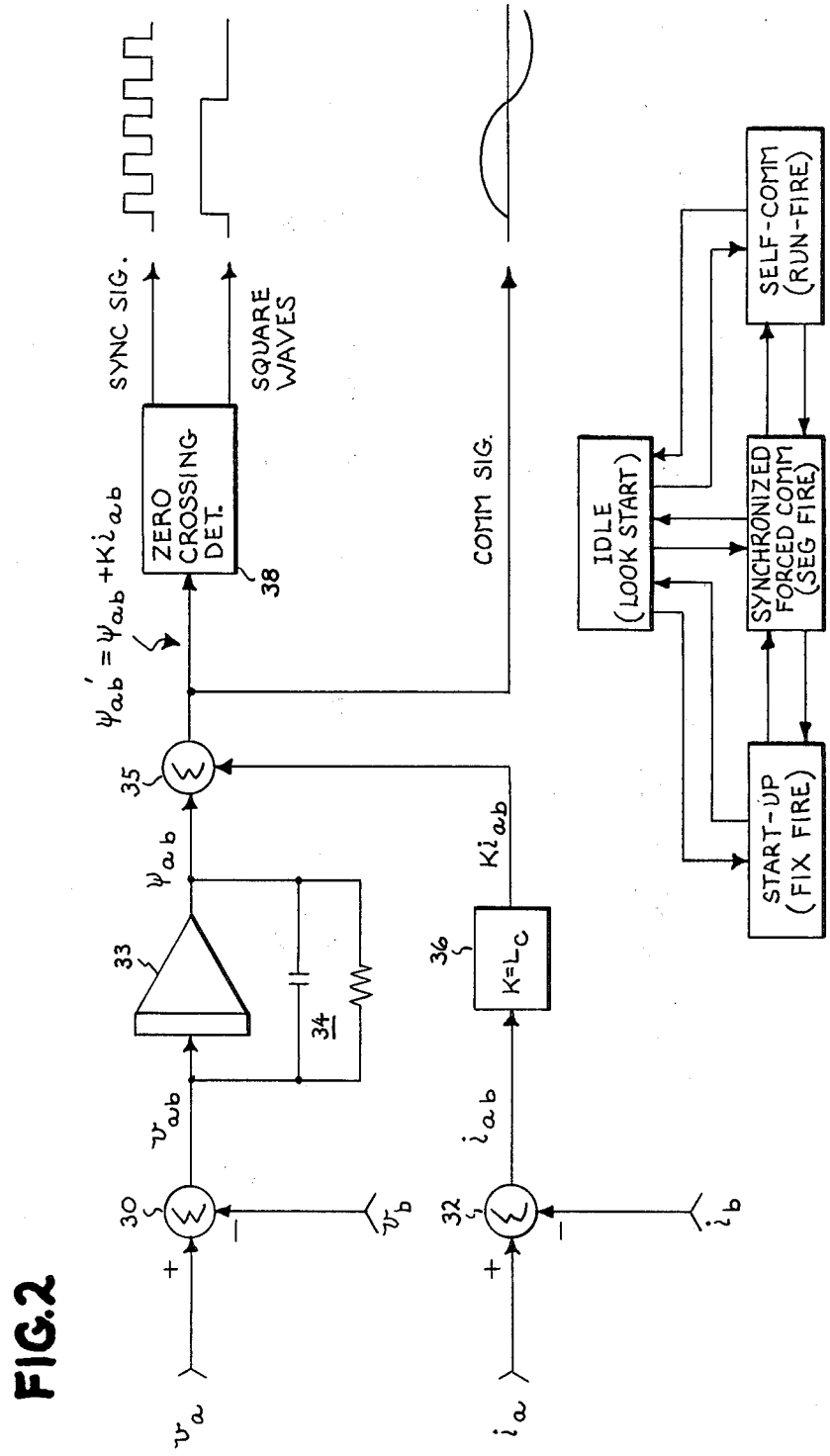
FIG. 2 is a simplified block diagram illustrative of circuitry for generating one of six integrated line to line voltages or pseudo-flux waveform voltages used by the subject invention.

Referring now to FIG. 2, there is shown in its simplest form the manner in which one of the above reconstructed waves for generating the pseudo-flux waveforms is generated. There $v_a$ and $v_b$ represent two of the three phase source side or load side terminal voltages $v_a$, $v_b$ and $v_c$ which are referenced to a fictitious neutral while $i_a$ and $i_b$ represent two line currents for the phases a and b. A line to line voltage $v_{ab}$ is developed by differencing the phase voltages $v_a$ and $v_b$ at a summing junction 30 while a "delta" current $i_{ab}$ is developed by differencing the line currents $i_a$ and $i_b$ in a summing junction 32. The line to line voltage $v_{ab}$ is fed to a signal integrator, which includes a feedback operational amplifier 33 and a resistive-capacitive integration feedback network 34, whose output corresponds to a pseudo-flux wave $\Psi_{ab}$. The flux wave $\Psi_{ab}$ is applied to a summing junction 35 along with a signal $Ki_{ab}$ which corresponds to the delta current $i_{ab}$ which has been appropriately scaled (block 36) by the commutation inductance $L_c$. The output of the summing junction 35 comprises the waveform $\Psi'_{ab} = \Psi_{ab} + Ki_{ab}$ and consists of a generally sinusoidal waveform having well defined zero crossings notwithstanding the occurrence of commutation notches in the phase voltages $v_a$, $v_b$ and $v_c$. These waveforms are shown, for example, in FIG. 3.

In FIG. 3, waveform set A is illustrative of the three sinusoidal phase to neutral voltages $v_a$, $v_b$ and $v_c$ with the waveform $v_a$ having a zero crossing at 0°. With respect to the waveform set B, these waveforms represent the three line to line voltages $v_{bc}$, $v_{ca}$ and $v_{ab}$. The waveform set C on the other hand is illustrative of the pseudo-flux waves derived from the integrals of the reconstructed line to line voltages and is shown constituting the waveforms $\Psi'_{ca}$, $\Psi'_{ab}$ and $\Psi'_{bc}$ meaning that they have been compensated for any commutation notches in accordance with the teachings of U.S. Pat. No. 4,399,395 Waveform set D is illustrative of the synchronizing pulse signals produced in response to the zero crossings of the pseudo-flux waveforms. Since motor rotor position is defined by the motor voltages and since there is a fixed phase relationship between the pseudo-flux waves and the phase voltages, the pseudo-flux waves of set C can be used to define rotor position.

Accordingly, by connecting a zero crossing detector 38 (FIG. 2) to the summing junction 35, a set of synchronizing signals and square waves can be generated for operating either of the phase lock loops 18 and 20 (FIG. 1) which are preferably of the digital type, two typical examples of which are shown and described in the above referenced U.S. Pat. No. 4,263,557, entitled, "Power Converter Control", as well as in U.S. Pat. No. 4,090,116, entitled, "Closed Loop Digital Control System And Method For Control", issued to D. L. Lippitt on May 16, 1978 and U.S. Pat. No. 4,201,936, entitled, "Motor Speed Regulator Control System", issued to P. J. Roumanis on May 6, 1980.

Figure 4:
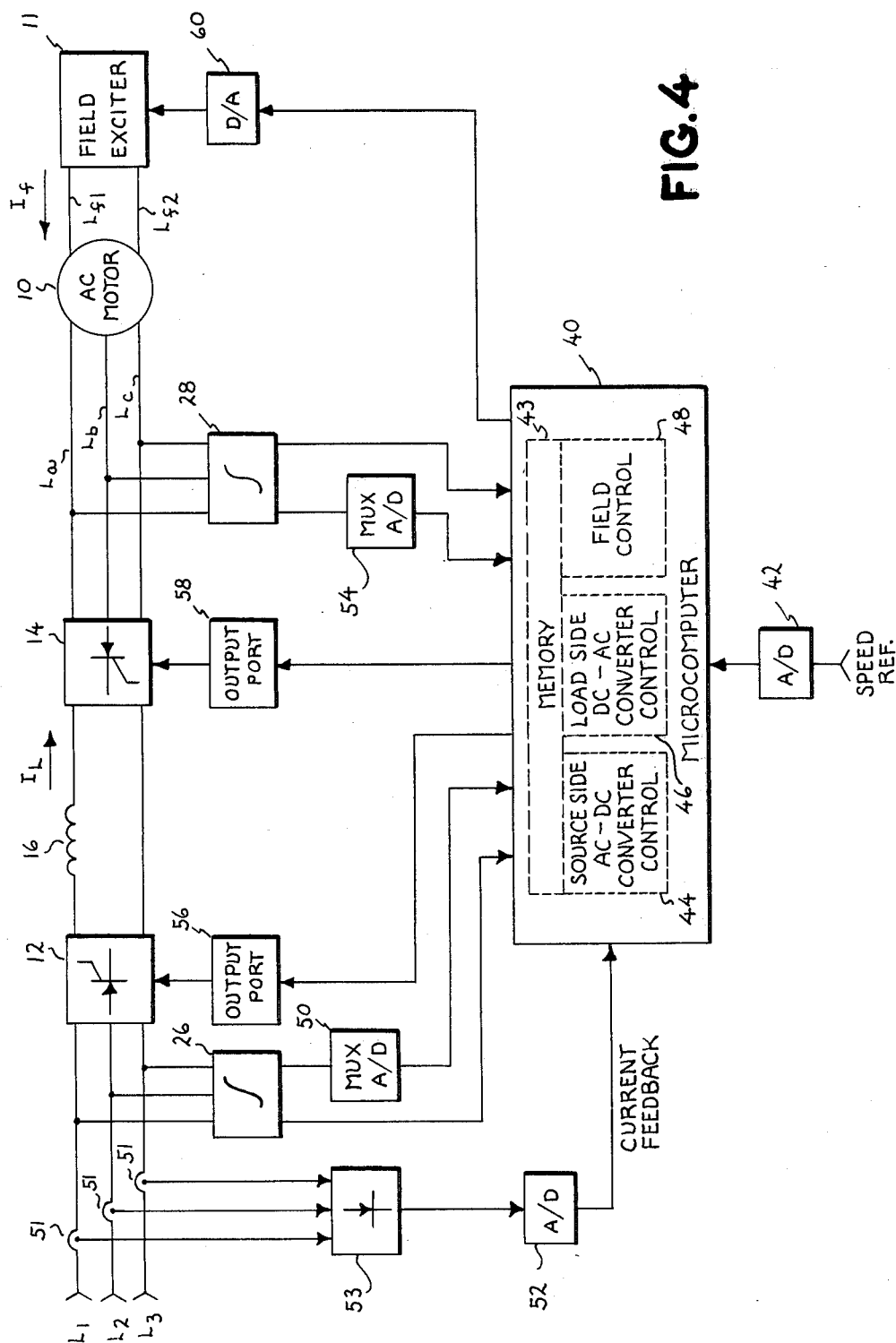
FIG. 4 is a major block diagram illustrative of an AC motor drive in accordance with the subject invention implemented by means of a microcomputer.

While the block diagram shown in FIG. 1 discloses a hardware implementation of a load commutated inverter (LCI) motor drive system incorporating the present invention, FIG. 4 is a block diagram illustrative of such a control system wherein a microcomputer 40 is utilized to implement the overall control. As shown in FIG. 4, a speed reference signal is provided to the control. Since rotor speed in a synchronous motor is proportional to load converter frequency, the speed feedback is actually implemented by using frequency feedback. This frequency is derived from the flux wave zero crossing signal and a software phase lock loop. The frequency is actually the inverse of the PLL counter load shown in FIG. 5. By this means, not only do the flux feedback signals eliminate the need for a rotor position sensor, but also a tachometer signal. If the speed reference signal is presented in digital form, A/D converter 42 is not necessary. The microcomputer 40 functions in accordance with self contained software routines contained in a memory, for example memory 43, to control the source side converter 12, the load side converter 14 and the motor field exciter 11 as indicated, respectively, by the dashed line blocks 44, 46 and 48. The microcomputer 40 receives inputs from and provides outputs to the power circuitry which is shown identically to that illustrated in FIG. 1, that is, three power lines $L_1$, $L_2$ and $L_3$ which connect a three phase source, not shown, to the source side converter 12 which is connected to the load side converter 14 by way of a DC link circuit including an inductor 16 and a current sensor 19. The load side converter 14 furnishes power to the motor by way of lines $L_a$, $L_b$ and $L_c$. The field exciter 11 is coupled to and supplies a current $I_f$ to the AC motor 10 by way of lines $L_{f1}$ and $L_{f2}$.

Synchronization information for the source side converter 12 is furnished by way of the integrator 26 such as shown in FIG. 2 connected to lines $L_1$, $L_2$ and $L_3$ while commutation information therefor is provided by a multiplexed A/D converter 50. A current feedback signal for the motor load current $I_L$ is also coupled back to the microcomputer 40 by way of a rectifier 53 and an A/D converter 52 which constructs the DC link current from at least two current transformers 51 measuring 60 Hz source line currents. Synchronization and commutation information for the load side converter is provided by the integrator 28 and the multiplexed A/D converter 54. These components furnish the microcomputer 40 with the necessary representations of phase voltages and currents to generate pseudo-flux waveforms in a manner shown in FIGS. 2 and 3. The microcomputer 40 employs the various input signals in a functional manner as described with respect to the hardware implementation shown in FIG. 1 to provide suitable outputs to control thyristor bridges of both the source side converter 12 and the load side converter 14. In FIG. 4 this is illustrated as outputs provided to two output ports 56 and 58 coupled to the microprocessor input/output bus, not shown, which provide the necessary thyristor firing signals to the units 12 and 14. An additional digital to analog interface 60 is shown connected from the microcomputer 40 to the field exciter 11 for controlling the motor field current $I_f$.

Figure 5:
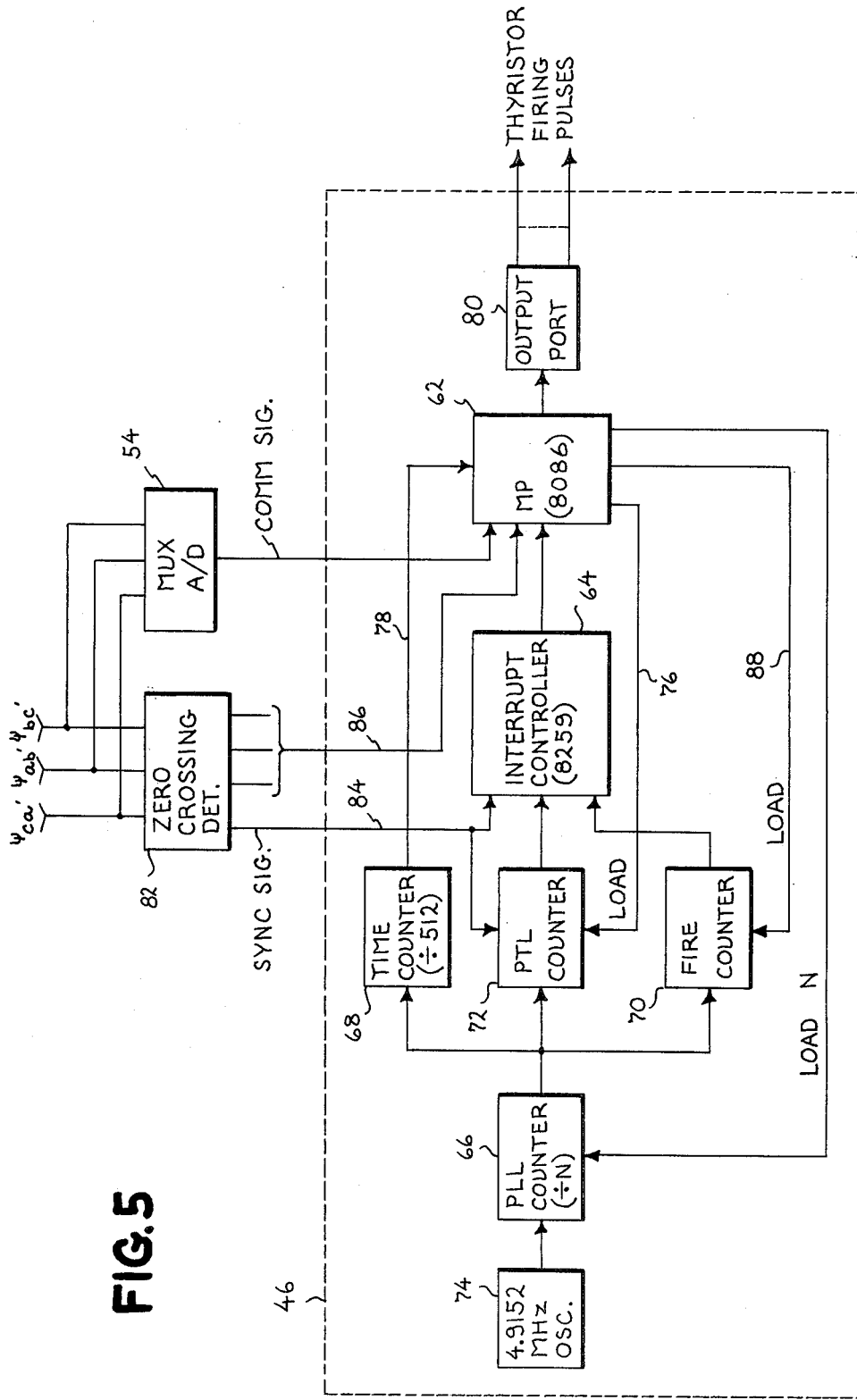
FIG. 5 is an electrical block diagram illustrative of a digital phase lock loop incorporated in the microcomputer shown in FIG. 4.
Figure 7A:
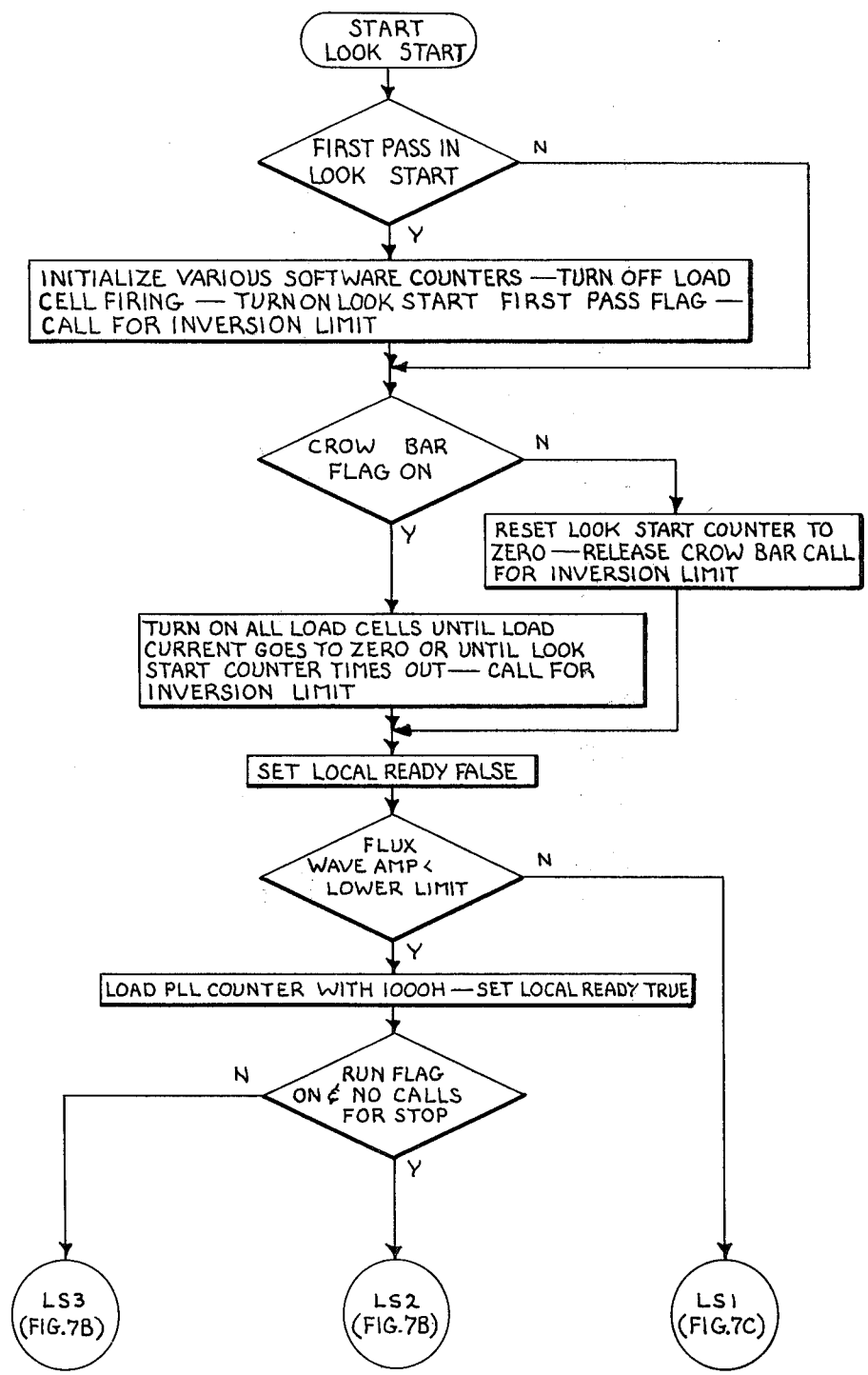
FIGS. 7A through 7D comprise a flow chart illustrative of the LOOK START software routine for implementing the idle mode of operation.
Figure 7B:
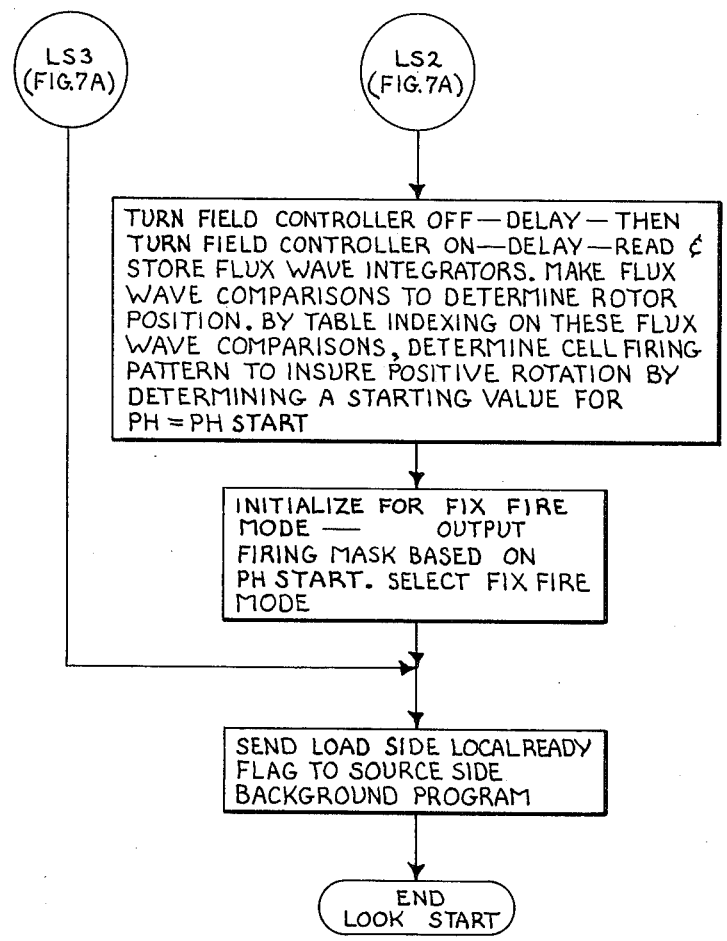
Figure 7C:
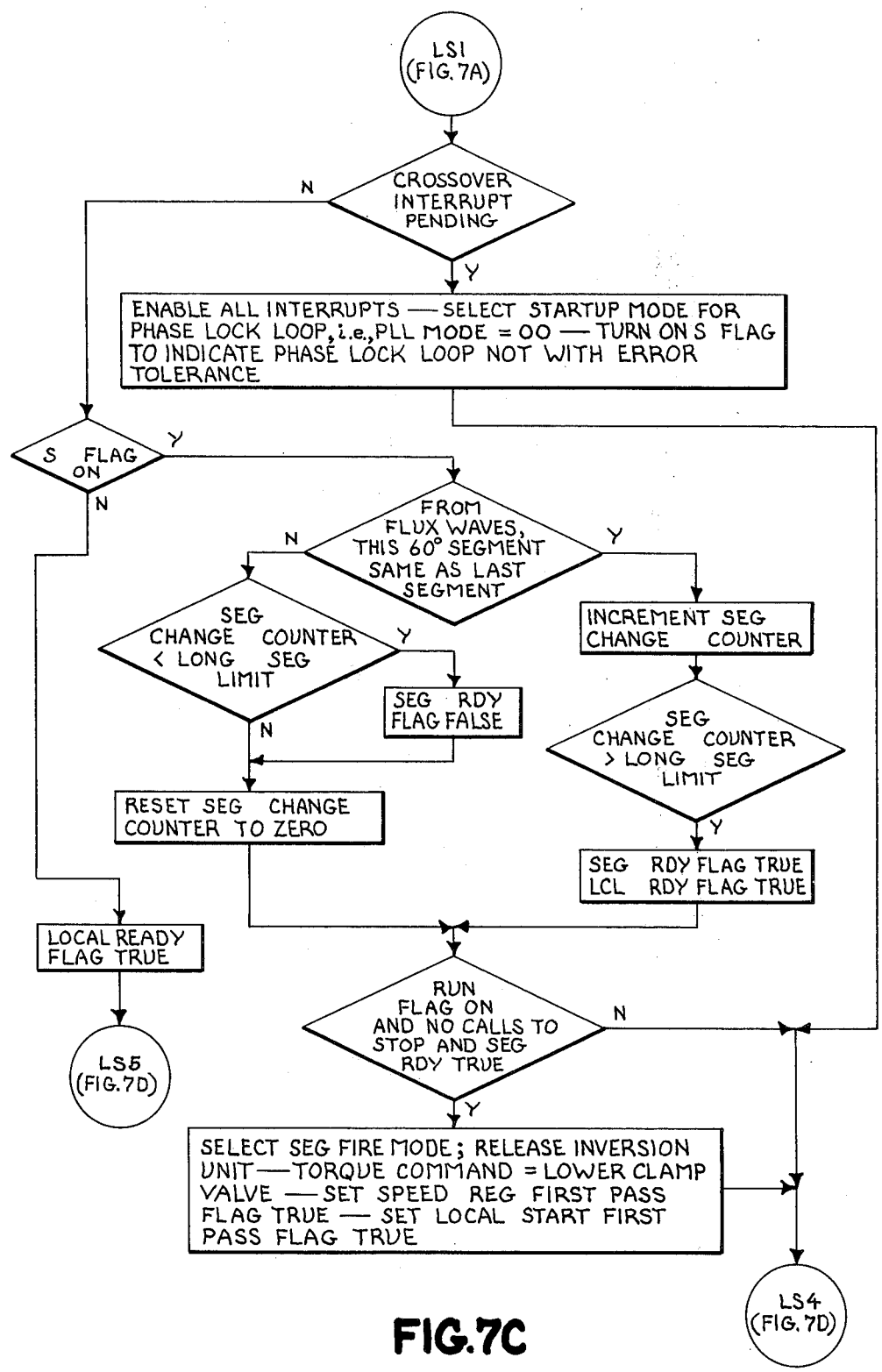
Figure 7D:
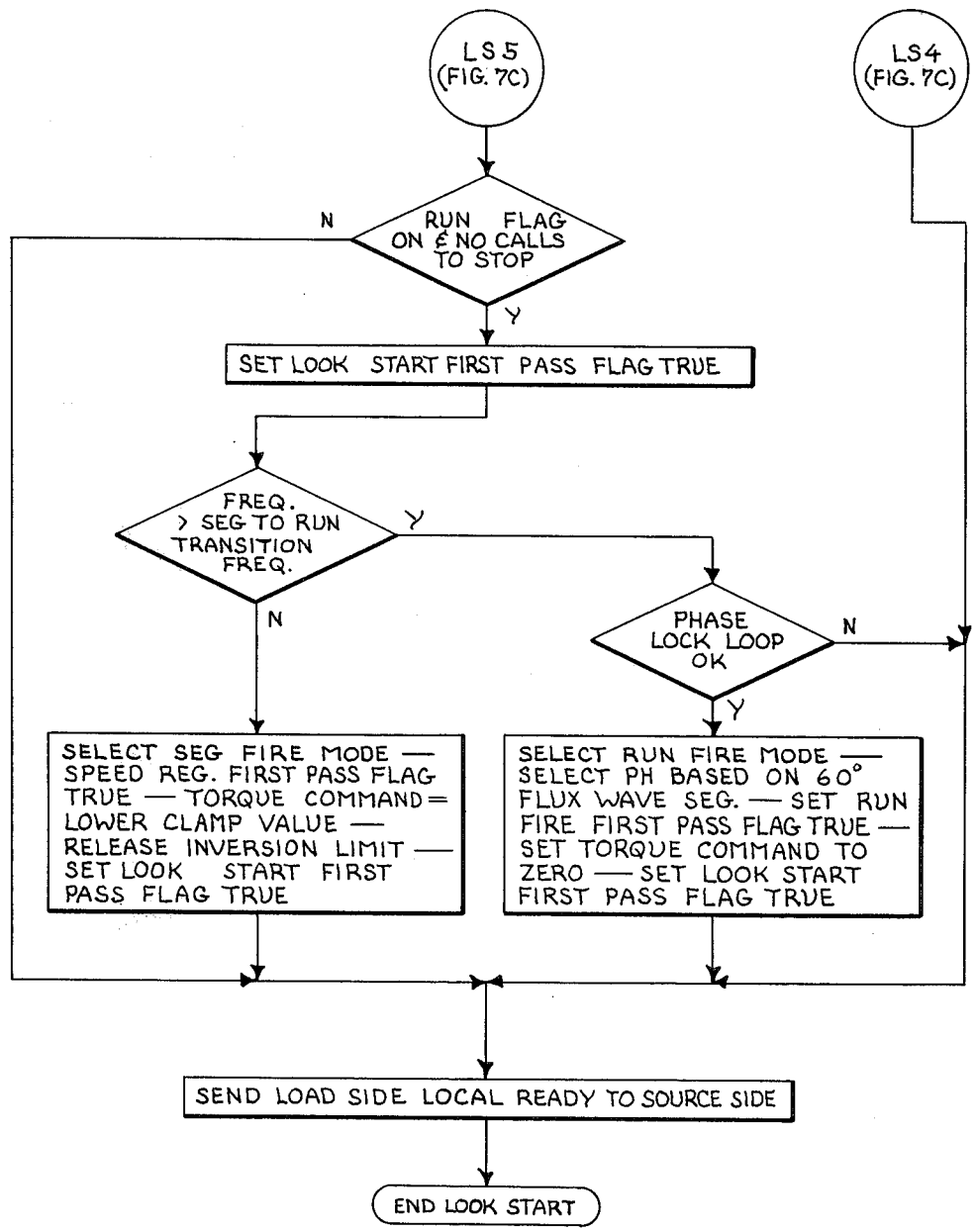

Referring now to FIG. 5, shown in block diagrammatic form is the apparatus simulated by software for the load side converter control block 46 and included in the microcomputer 40 of FIG. 4 for supplying power to the motor 10. As shown in FIG. 5, a microprocessor 62, typically comprising an Intel 8086 programmed in PLM language and including self-contained interrupt programs under the control of an Intel 8259 interrupt controller 64, operates to execute a particular task or calculation which typically involves storing the time to execute some future event in a down-counter. When the down counting reaches zero, the counter generates another interrupt which initiates the event after which the counter is reloaded for the time to execute the next event.

The software is adapted to implement a phase lock control loop comprised of four down counters, namely a phase lock loop counter 66, a time counter 68, a fire counter 70, and a pulse train limit counter 72. In the normal mode of operation, which comprises a self commutating mode, a variable frequency source is created by the phase lock loop counter 66 by dividing a 4.9152 MHz output pulse train from a master clock oscillator 74 by a value "N" set by a signal "PRESET N" from the microprocessor 62 on a data bus 76. The output of the counter 66 is adapted to be maintained at a frequency 512 times the frequency of the pseudo-flux waveforms $\Psi'_{ca}$, $\Psi'_{ab}$ and $\Psi'_{bc}$ which are shown, for example, by the waveform set C of FIG. 3. This frequency is obtained in the following manner. The time counter 68 is initially set at a count of 512 and decremented by one count each clock pulse from the PLL counter 66. When counter 68 is decremented to zero, it resets to a count of 512. Thus counter 68 provides a measure of the phase angle relative to the pseudo-flux waveforms. The count value in the time counter 68 is fed to microprocessor 62 via data bus 78 where it is used as a phase reference for firing the thyristor cells, not shown, of the converter 14 through a digital output port 80. Synchronization is adapted to be achieved by passing the pseudo flux waveforms $\Psi'_{ca}$, $\Psi'_{ab}$ and $\Psi'_{bc}$ through a zero crossing detector means 82 which, in actuality, comprises three zero crossing detectors which generate a synchronizing pulse signal every time a flux wave passes through zero. These pulses are fed to the interrupt controller 64 on signal line 84 which interrupts the microprocessor 62 and initiates a crossover service program. The zero crossing detector means 82 also generates a three bit number which is provided on data bus 86 for indicating the relative signs of the motor flux waveforms, which number is fed to and read by the microprocessor 62 and is used to identify which zero crossing has caused the interrupt pulse as well as providing the means indicating not only the motor's rotor position, but its direction of rotation by sensing the phase sequence. The crossover service program reads the value in the time counter 68 and compares it to the correct value for the particular flux wave crossing to generate a phase error between the counter 68 and the flux waves. This error is used to calculate a new "PRESET N" value which is then loaded into the phase lock loop counter 66. The timing of the firing of each thyristor in the load side converter 14 is accomplished by means of the fire counter 70. After a thyristor firing, the microprocessor 62 computes the time to fire the next thyristor. This time is compared to the value in the time counter 68 which corresponds to current time. The difference in "time to go" is then loaded into the fire counter 70 via the data bus 88 which decrements to zero, causing a yet another interrupt through the interrupt controller 64 which initiates a cell firing program. This basically describes the self commutation mode which is but one of four operational modes included in the subject control implementation. Prior to discussing the other modes, however, the interrupt programs of the microcomputer 40 (FIG. 4) as it relates to the load side converter 14 will be briefly considered. Five programs are implemented through operation of the interrupt controller 64 which in their order of priority are: (1) the fire counter service program; (2) the cross-over service program; (3) pulse train limit service program; (4) the phase lock loop correction program; and (5) the converter or inverter control program.

The fire counter service interrupt program is initiated every time the fire counter 70 times out. The fire counter service interrupt program also checks to see if the converter 14 is in a self-commutation mode which, as noted above, is the normal operating mode. If the converter 14 is in the self commutating mode, it sets up the next fire counter load output from the microprocessor 62 for a count of 60° so that, barring later information, the next fire counter service interrupt program will occur at 60°. The fire counter service interrupt program then checks to see if a new cell or a new thyristor firing is to occur during this pass through the program; if so, the thyristor cell firing algorithm is called. Then the fire counter service interrupt generates an interrupt to initiate the converter control interrupt program which is of the lowest level of priority but constitutes the subject matter of the invention as will be subsequently shown.

The second highest priority interrupt program is the cross-over interrupt program which, as previously noted, is generated at every zero crossing of the reconstructed pseudo-flux waves $\Psi'_{ca}$, etc. that occur six times per cycle of the fundamental frequency and from which are generated the synchronizing signals for the software phase lock loop shown in FIG. 5. The cross-over interrupt program, moreover, reads the time counter 68 which is clocked from the phase lock loop counter 66. As already indicated, the clock rate is 512 pulses for each cycle of the fundamental load frequency. Thus, the fundamental frequency period is divided by 512, giving the time counter angle resolution of 360° divided by 512, which is equal to 0.703°. The cross-over program also reads the pulse train limit counter 72 which started counting down from a count equivalent to 30° when the zero crossing interrupt was generated. This enables a correction of the reading of the time counter 68 by the amount of time that the higher order of priority fire service interrupt program may have held off the cross over interrupt program.

The cross-over program then generates an interrupt calling for the phase lock loop correction interrupt program. The phase lock loop correction program next determines the angular error between the synchronizing cross-over interrupt pulses outputted from the zero crossing detector means 82 and the actual corrected time counter reading from the counter 68 whereupon a new (÷N) is loaded into the phase lock loop counter 66 and which operates to nullify this error.

Next, the pulse train limit service program, which is third in priority occurs when the pulse train limit counter 72 decrements to zero. This occurs twice for each 60° of the fundamental frequency. A first pulse train limit interrupt occurs 30° of fundamental frequency after a pseudo-flux wave zero crossing, principally to read the peak value of the appropriate pseudo flux wave and to update the variable keeping track of the current 30° segment. After this interrupt, the pulse train limit interrupt program reloads the pulse train limit counter 72 with 15° of count and starts the pulse train limit counter 72 decrementing. On reaching a zero count, a second pulse train limit interrupt occurs. In accordance with the second pulse train limit interrupt, the pulse train limit counter is reloaded with 30° of fundamental frequency count, but the counter doesn't initiate count down until the occurrence of the next flux wave zero cross over. The second pulse train limit interrupt which occurs 15° after the first is used to check commutation failure and if so, to initiate an algorithm to recover from this commutation failure.

The fourth highest priority interrupt program is the phase lock loop correction interrupt program and is called once for each cross-over interrupt program. The phase lock loop correction interrupt program calculates the value of the divider (÷N) for the PLL counter 66 to maintain synchronism between the pulse output of the counter and zero crossings of the pseudo-flux waves.

The load side converter control interrupt program, while being the lowest in priority, contains the bulk of the operational mode determination, regulator, thyristor firing angle determination functions and accordingly calls the appropriate algorithm. The converter control interrupt program, moreover, is called by the highest priority fire service interrupt program. This leads now to a consideration of the other three modes of control. The other three modes constitute: an idle mode, an initial forced commutation start up mode and an intermediate synchronous forced commutation mode between the start up mode and the self commutation mode. The manner in which they may be entered is shown by the diagram of FIG. 6. The idle mode consists of a coasting or free running condition wherein the AC motor drive and more particularly the load side converter 14 as well as the source side converter 12 are in a condition where the respective thyristor cells contained therein are not fired and remain so until the respective converters are capable of normal operation whereupon they are thereafter enabled and fired on demand. There is a foreground software program for the idle mode for both the source and load side converters. The source side background program determines that the appropriate switch gear coupling the three phase AC source to lines $L_1$, $L_2$ and $L_3$ is turned on, that no faults exist and that both the source and load phase lock loop flags are properly set. Passing all these conditions, the source background program sets a run flag. The source side idle mode is relatively straight forward in that upon determining that the run flag is set and the source phase lock loop is properly synchronized, then thyristor gating is enabled and the source idle mode is exited. The load side idle mode is relatively more complicated in that the motor 10 may be initially at rest or rotating at some arbitrary speed. If the motor is running, depending upon the value of the motor speed and ascertaining that pseudo flux wave balance exists and a certain amplitude criteria is present, the run flag is set and control transitions to either the intermediate synchronized forced commutation mode or the self commutation mode.

Considering now the various modes, the flow chart illustrative of the software or instructional code for implementing the idle mode of the load side converter 14 is illustrated in FIGS. 7A through 7D and comprises a routine identified as LOOK START.

As shown, the LOOK START routine initializes the various software counters, inhibits the load side cell firing and calls for firing the source side converter 12 at the inversion limit if it is the first pass in the routine. Next, if the load switch gear is being commanded to open, to prevent an over voltage, all the load side thyristor cells are turned on until the motor stator current $I_s$ goes to zero or until the LOOK START timer times out whereupon the load side inversion limit is called. Next, a determination is made of the amplitude of the pseudo-flux waveforms coupled from the multiplexed A/D converter 54 (FIG. 4), whereupon if they are below a lower limit, the routine branches to initialize the start up mode (FIX FIRE). On the other hand, if the pseudo-flux waveforms are present and above a predetermined magnitude, the LOOK START routine branches into a determination as to whether the aforementioned intermediate synchronized forced commutation mode (SEG FIRE) is to be commanded or the self-commutated mode (RUN FIRE) is to be entered into. The remaining checks enable the LOOK START routine to be reentered from any mode on a normal system shut down or on a fault shut down. Typically, on a shut down, the load current $I_L$ is commanded to zero and on reaching zero the control shifts to the idle mode.

Figure 8A:
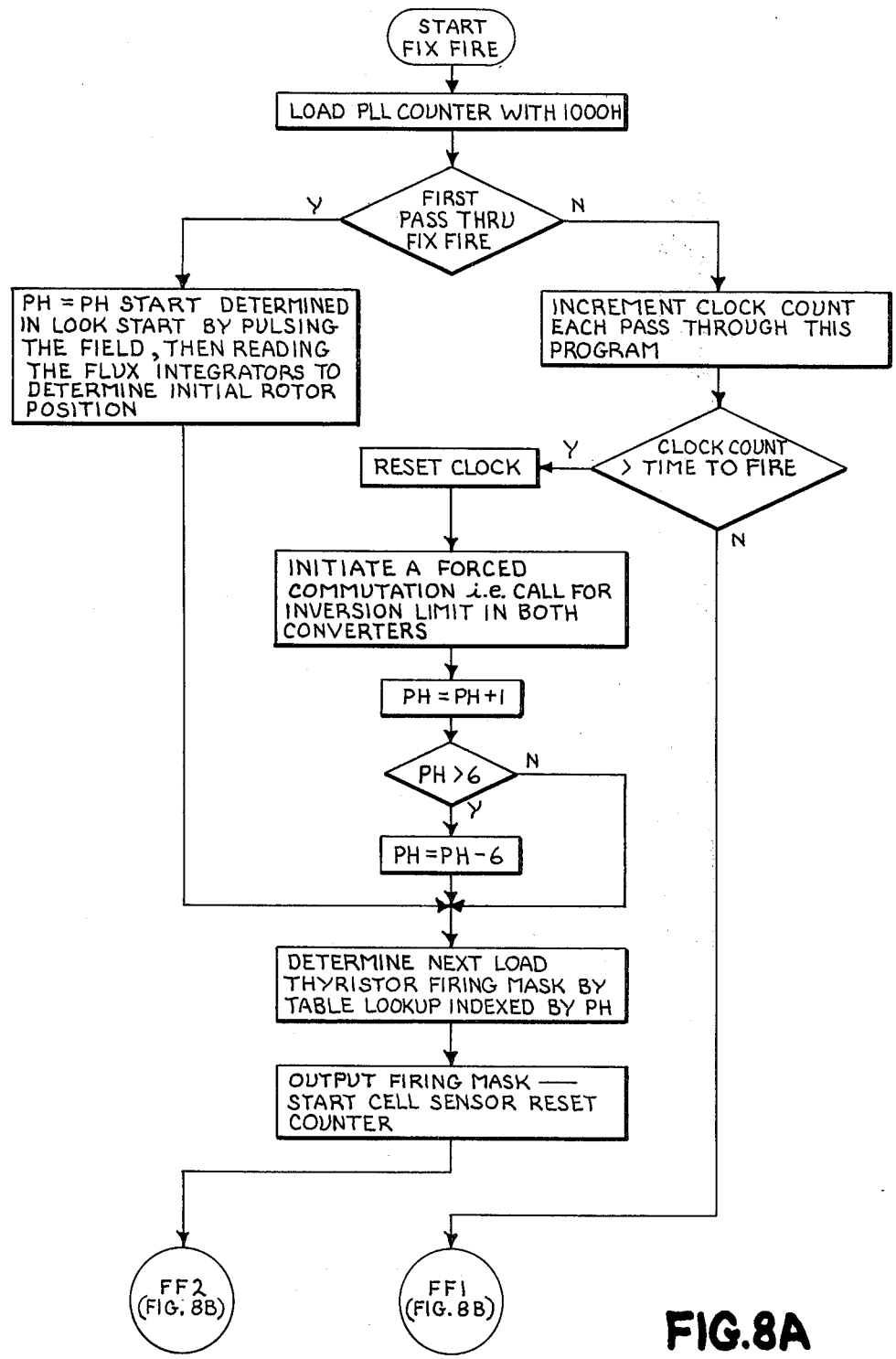
FIGS. 8A and 8B comprise a flow chart illustrative of the FIX FIRE software routine for implementing the start-up mode of operation.
Figure 8B:
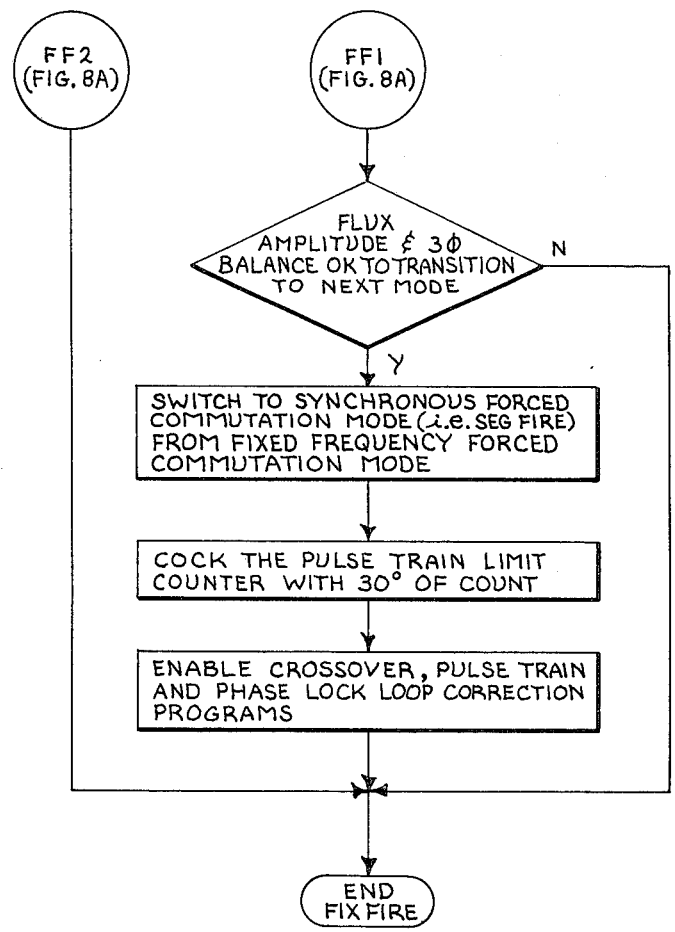

The start-up mode which is implemented by the FIX FIRE routine, as shown in FIGS. 8A and 8B, is initiated when the motor 10 is in a stand still (zero speed) condition. In normal operation, the motor control derives the position of the rotor of the motor 10 from the pseudo-flux waves since the terminal voltages on lines $L_a$, $L_b$ and $L_c$ comprise the motor back EMF voltage present and the load thyristors are accordingly fired in synchronism with the rotor position. At rest, however, pseudo-flux waves are non existent. To get initial rotation of the rotor, the load side thyristor cells are fired at a predetermined low frequency. This frequency is preferably fixed and is made to be proportional to $\sqrt{T/J}$ where T is the available starting torque based on the motor field current $I_c$ and stator current $I_s$ applied and J is the total rotor and load inertia. This criteria is provided to enable the rotor to initially rotate about 60 electrical degrees with the available torque in 1/6 of a cycle so that rotation is sustained at this frequency. The FIX FIRE routine furthermore eliminates any tendency for reverse rotation by calling for a pulsing of the motor field current $I_f$ and determining the relative amplitude and sign of the pseudo-flux waves from the integrator 28 (FIG. 4). Having determined the rotor position, the appropriate thyristor cells are fired initially to guarantee correct rotation. Thyristor firing is then determined from a table look-up in the memory 43. Once flux waveforms of sufficient amplitude and a three phase balance occurs there is a command generated to make a transition to the intermediate or synchronous forced commutation mode. The transition from the start-up mode to the synchronous forced commutation mode occurs once the sum of the absolute values of the pseudo-flux waveforms exceed some arbitrary value, approximately 50–60% of rated amplitude (full motor speed) and also that the three phases of the waveforms $\Psi'_{ca}$, $\Psi'_{ab}$ and $\Psi'_{bc}$ are balanced as determined by insuring that the instantaneous sum of the three flux waves, which ideally should be zero, is less than some arbitrary value such as 10–20% rated flux amplitude.

The synchronous forced commutation mode of operation occurring following start-up is one wherein the pseudo-flux wave amplitudes are sufficient to provide synchronizing signals (waveform set D of FIG. 3), but the motor speed is too low to provide an adequate amplitude of back EMF for self-commutation (waveform set C of FIG. 3). Forced commutation is defined to be the process of decreasing the DC link current $I_L$ (FIG. 4) to zero by forcing the source side converter 12 to an inversion limit whenever a new load side thyristor cell is fired. The duration of this zero current period is typically 5 milliseconds. Once in synchronous forced commutation the control can transition up to the self-commutation mode or back down to the fixed frequency (start up) mode depending on motor speed.

Figure 9A:
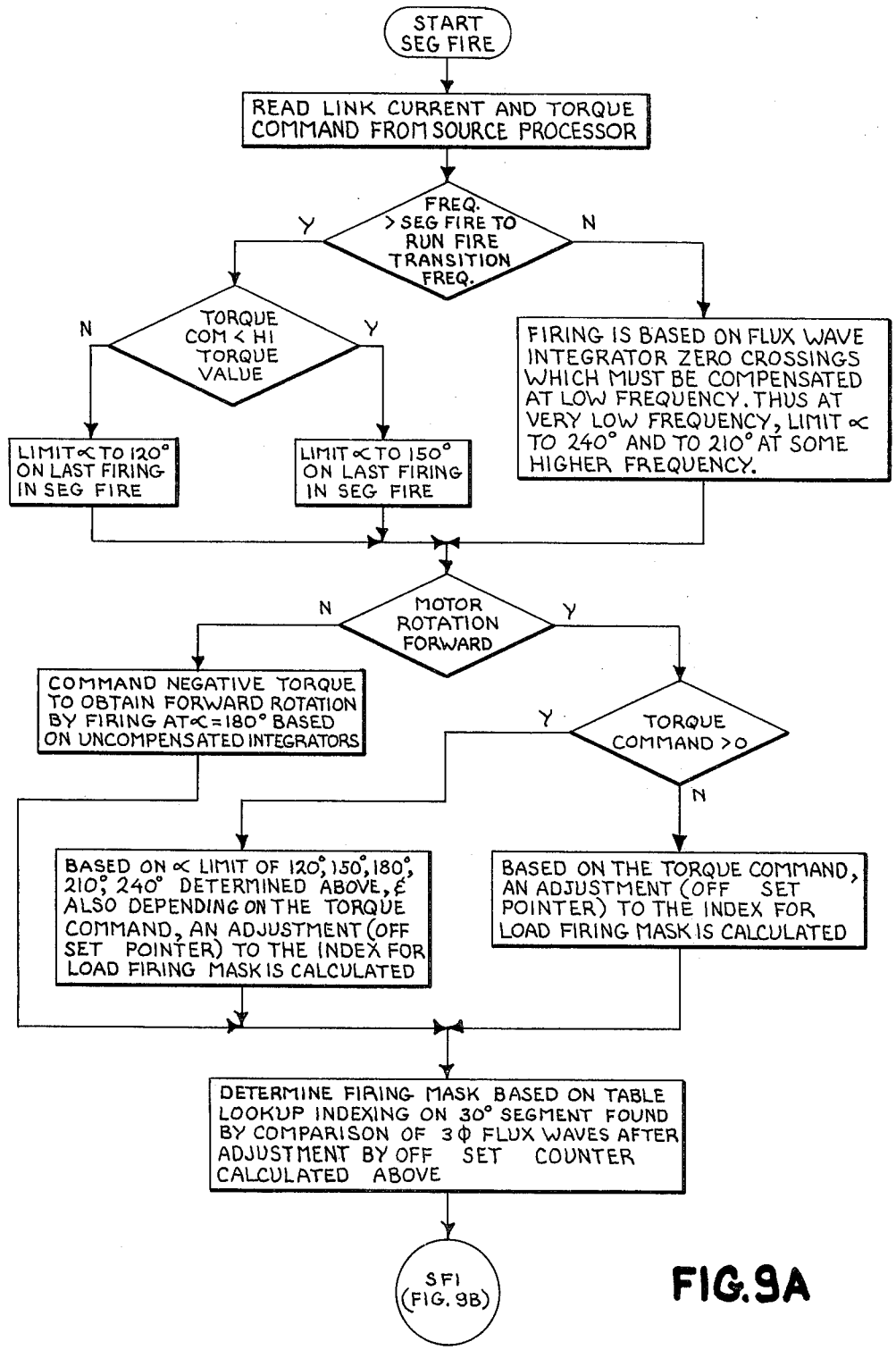
FIGS. 9A and 9B comprise a flow chart illustrative of the SEG FIRE software routine for implementing the forced commutation mode of operation following startup.
Figure 9B:
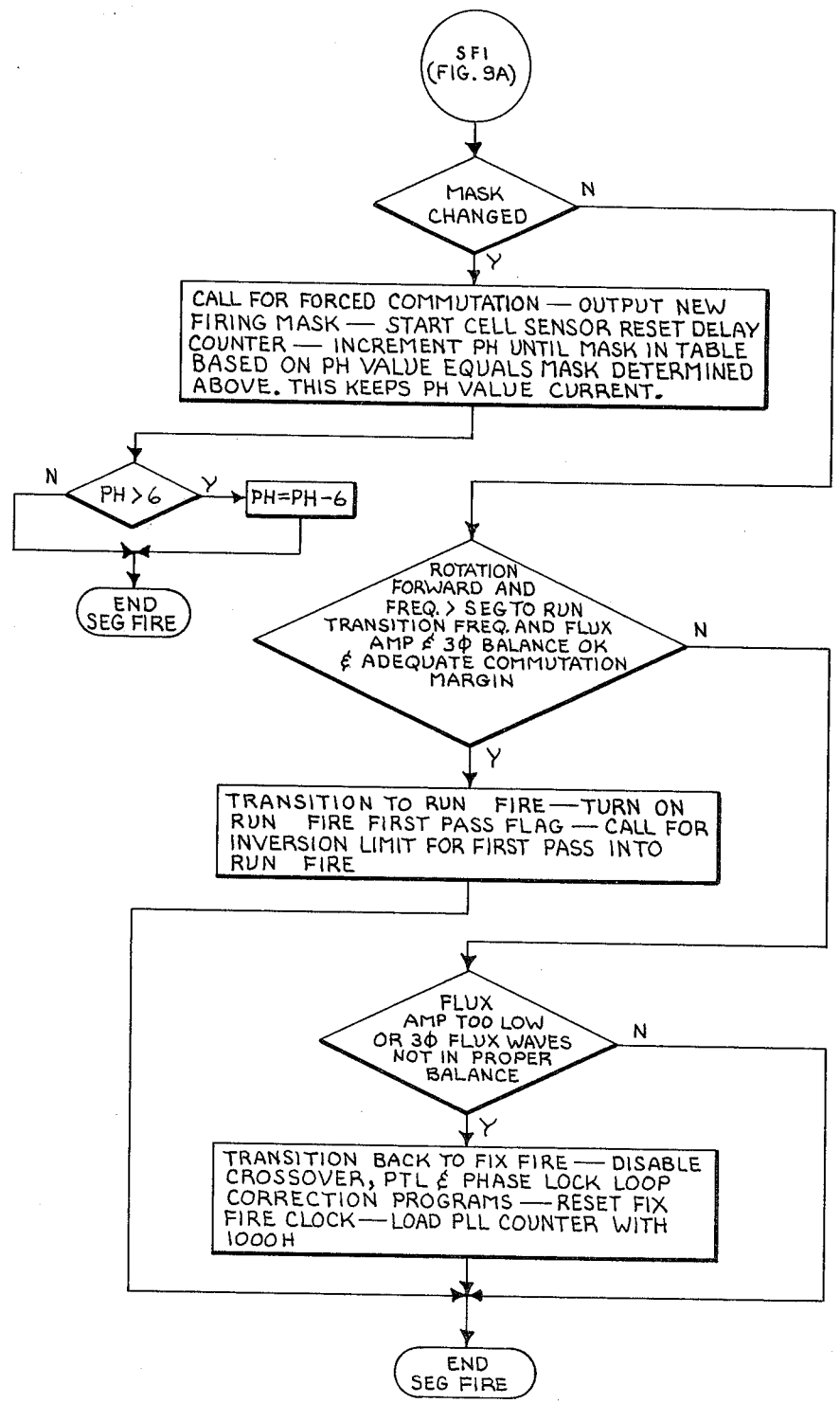

The instructional code for the synchronized forced commutation mode is evidenced by the flow chart shown in FIGS. 9A and 9B and comprises a routine identified as SEG FIRE. Following a query as to motor speed, the load side cell thyristor firing is based on the flux wave integrator zero crossings which have been compensated for at low frequency. Following a determination of motor rotation, thyristor cell firing is commanded along with forced commutation followed by queries as to whether a transition from this mode should be made. The flux amplitude to enable a transition from the synchronized forced commutation mode to the self-commutation mode is arbitrarily set somewhat higher than the amplitude required to transition from the start up (fixed frequency) mode to the synchronous forced commutation mode which occurs at about 10% of rated speed. Similarly, the flux amplitude required to transition from the synchronous forced commutation mode back to the fixed frequency mode is less than that to transition from the fixed frequency start up mode to the synchronous forced commutation mode in order to provide some hysteresis. In similar fashion, the amount of permissible flux unbalance to transition from the synchronous forced commutation mode to the self commutation mode is less than that allowed to transition from the fixed frequency start up mode to the synchronous forced commutation mode. Also, for hysteresis the flux unbalance to force a downward transition from the synchronous forced commutation mode to the fixed frequency or start up mode is greater than that which calls for a transition in the opposite direction.

Several other notable characteristics exist for the synchronous forced commutation (SEG FIRE) mode. First, the integrator zero crossings are compensated for at low frequency. To reduce DC drift in the integrator 28 (FIG. 4) a resistor is connected across the capacitor in the feedback path as shown by the feedback network 34 of FIG. 2. This network exhibits a phase error at low frequencies which is compensated in the software as shown in FIG. 9A in order to maintain the approximately unity power factor operation of the load side converter 14 in order to maintain maximum torque per ampere.

A means to prevent any tendency for reverse rotation has been described in the LOOK START routine which fired the first thyristor pair to guarantee forward rotation. As a back-up and for drives which do not include control of the field, the SEG FIRE routine also includes steps as shown in FIG. 9A to correct for reverse rotation. If, for example, the initial self firing during the start up mode causes a wrong rotation but the flux amplitudes of the pseudo flux waveforms nontheless signals for a transition into the synchronized forced commutation mode, the SEG FIRE routine senses and determines that the pseudo flux waves are in the wrong sequence and thereafter alters the thyristor firing angle based on flux waves so as to produce torque in the correct direction.

There is also a lower frequency limit on the range in which the load side phase lock loop as shown in FIG. 5 can operate within a reasonable error to provide synchronization during the synchronized forced commutation mode. Accordingly at some lower frequency (<5 Hz) of load side operation, synchronization is maintained by the prediction of the next pseudo flux wave zero crossing based on the last two pseudo flux wave zero crossing intervals. Above 5 Hz, the projection routine is switched to a closed loop tracking method explained earlier using the respective pseudo flux wave zero crossings for synchronization. Transition from the synchronized forced commutation mode to the self commutation occurs at approximately 6 Hz. Accordingly, the synchronized forced commutation mode exhibits two types of synchronization.

In applications for pumps, fans, compressors, for example, the drive motor 10 utilized typically has a torque proportional to speed squared load characteristic and, when operating in the synchronized forced commutation mode, the load range from full motoring to full braking is obtained by simultaneously commanding a motor current proportional to the absolute value of torque command and adjusting the load side firing angle from $\alpha = 180°$ to $\alpha = 0°$ in steps of 30°. This resolution is chosen because the 30° segments are easily obtainable from the pseudo-flux waveforms as can be seen from FIG. 3. For applications requiring constant torque over the entire speed range, the resolution of the load firing angle can be based on the phase lock loop accuracy, i.e. 1°–2° rather than 30° when based on the flux wave segments.

As noted above, the normal mode of operation comprises the self commutation mode and can be entered either from the idle mode if the motor is initially rotating, or from the synchronized forced commutation mode. Once in the self commutation mode, the control can transition back to synchronized forced commutation if the motor speed becomes too slow. Such a transition occurs at approximately 6 Hz. Also on a shut down, the control can transition downwardly from the synchronized self commutation mode to the idle mode directly once the DC link $I_L$ current has reached zero.

Figure 10A:
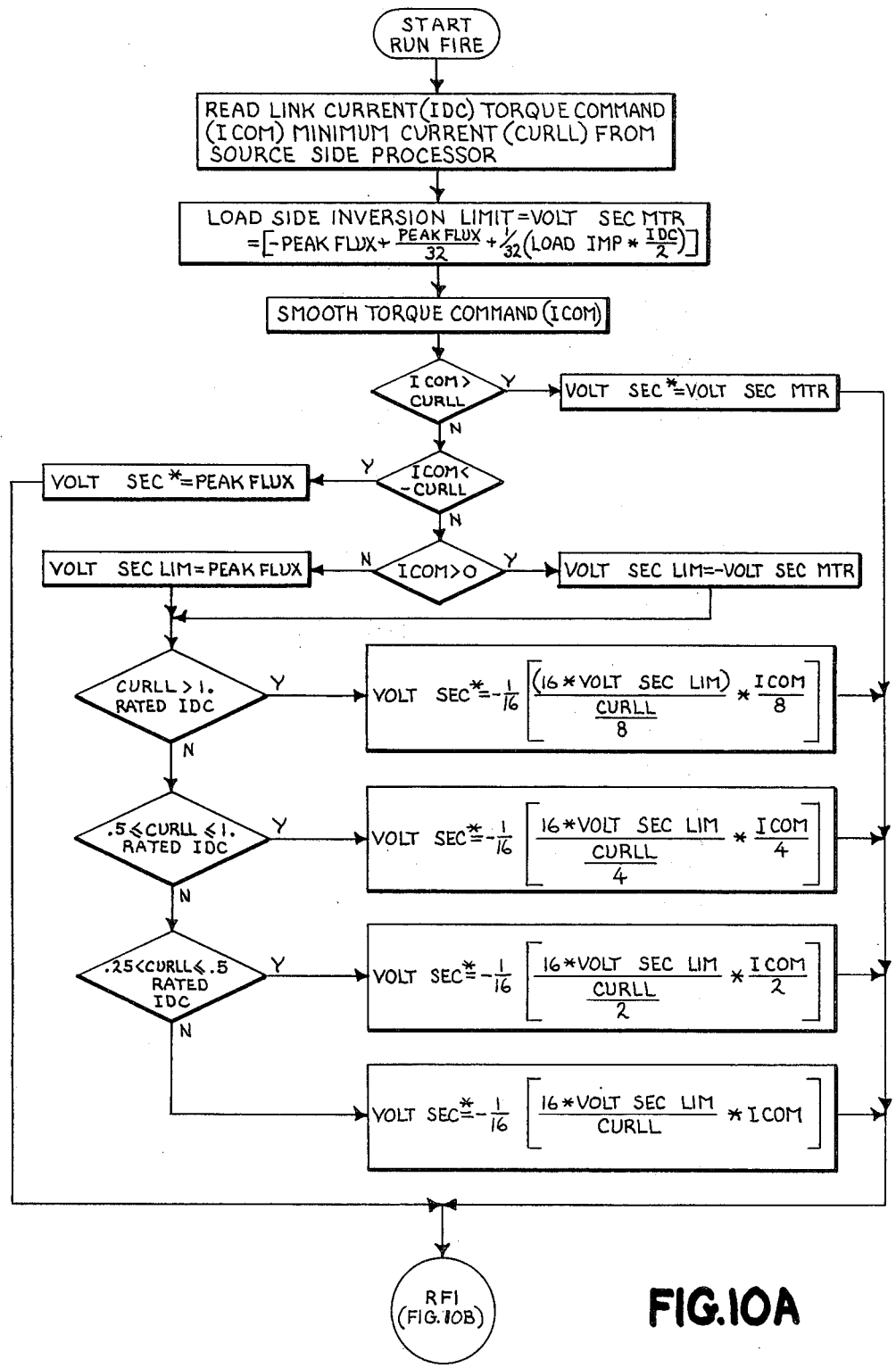
FIGS. 10A through 10D comprise a flow chart illustrative of the RUN FIRE software routine for implementing the self commutation phase lock loop control mode of operation.
Figure 10B:
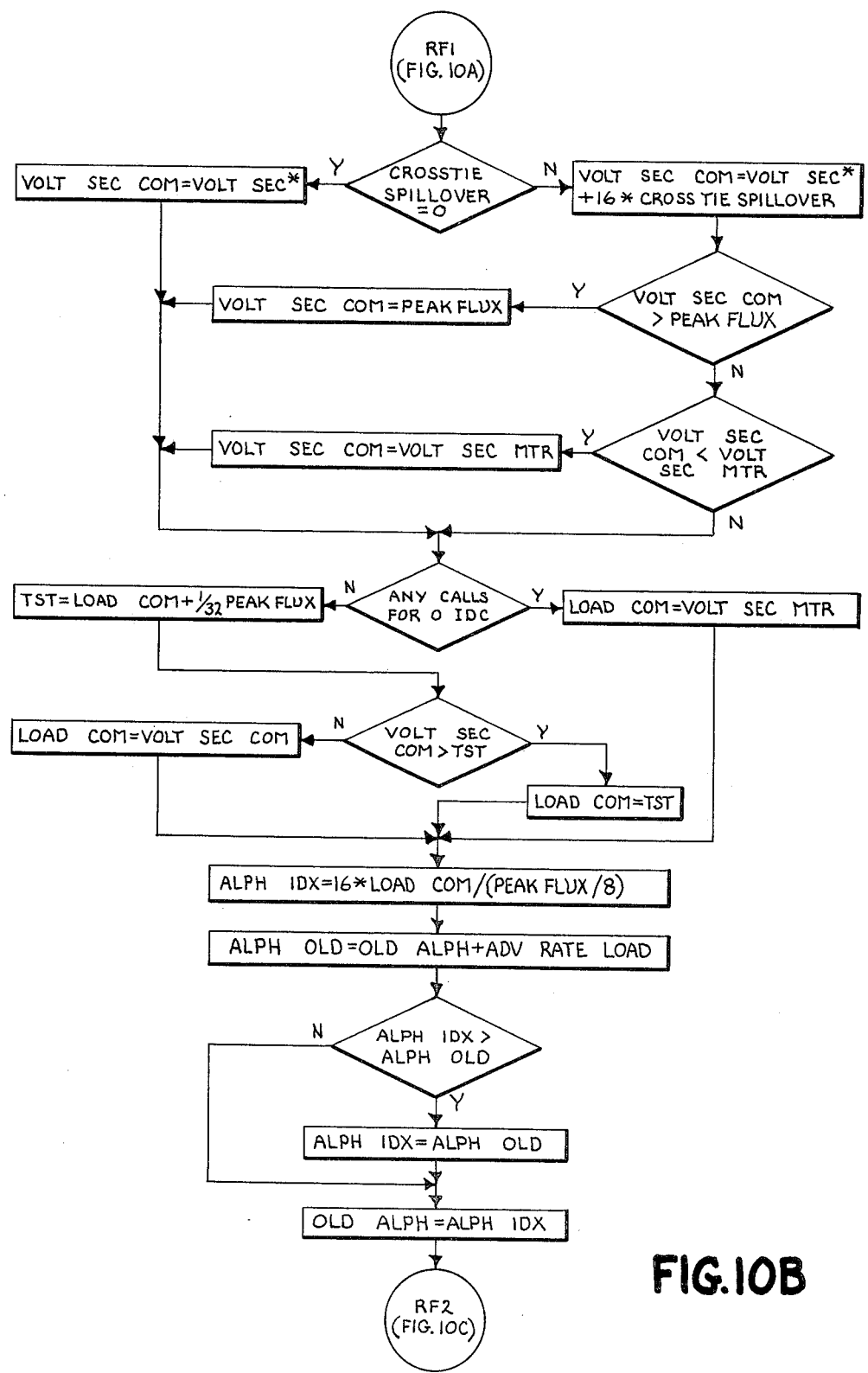
Figure 10C:
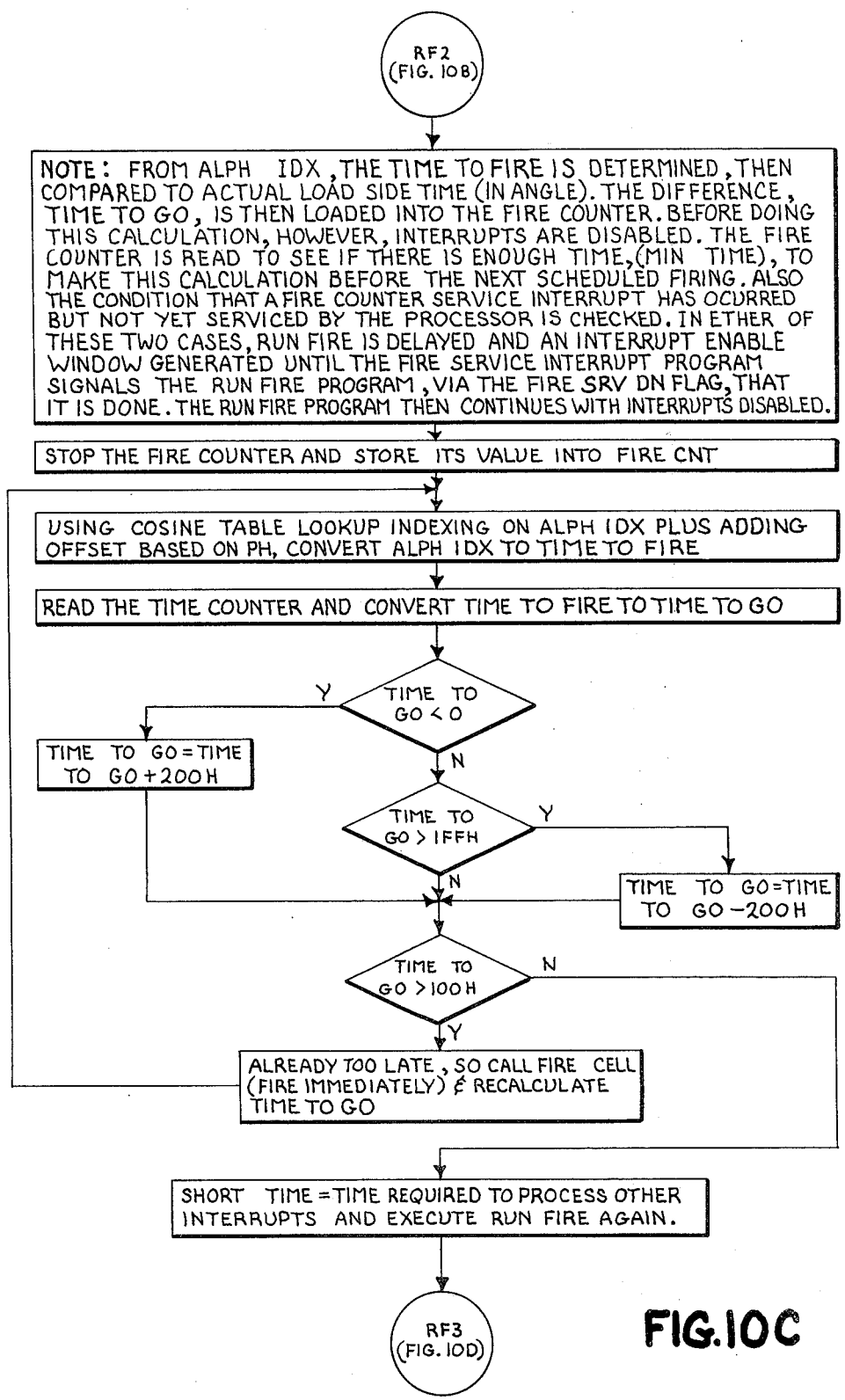
Figure 10D:
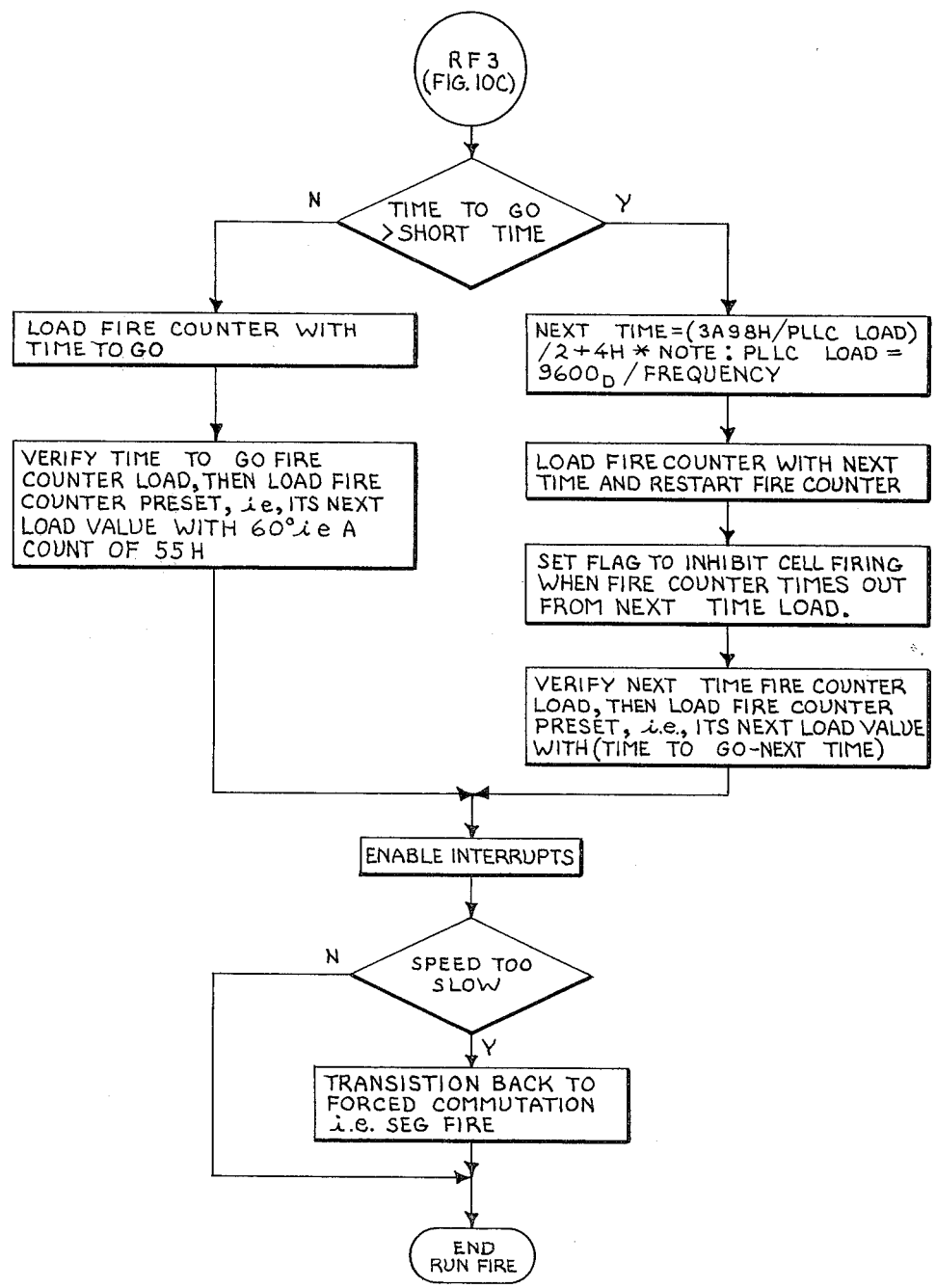

The flow chart for the self commutation mode is shown in FIGS. 10A through 10D and is defined as the RUN FIRE routine. The first part of the RUN FIRE routine as shown in FIG. 10A consists in computing the commutation margin and firing angle for the value of the magnitude of the flux waves and in addition any component resulting from any cross-tie signal which is generated in accordance with the above cross referenced application, U.S. Ser. No. 333,928 entitled, "Cross-Tied Current Regulator For Load Commutated Inverter Drives". Having determined the necessary commutation angle, the routine as shown in FIG. 10C calculates the "time to fire" each thyristor cell from the previously computed firing angle whereupon the time to fire count is compared against the current time in the time counter 68 of FIG. 5 which provides a "time to go" count which is then loaded into the fire counter 70 which if it is already too late, the next cell pair is immediately fired. Furthermore, if the time to go is too short to allow another regulator calculation, the fire counter 70 is loaded with the time to go count and the fire counter preset 66 is loaded with the equivalent 60° of count. By this means the next thyristor pair is fired after the time to go count is decremented in the fire counter and then the 60° of count is loaded into the fire counter such that if the next regulator calculation is not completed within 60°, the time for firing the next thyristor pair defaults to 60° after the last firing. If the time to go calculated above is long enough to run another regulator calculation, then the fire counter 70 is loaded with a count "next time" and the fire counter preset 66 is loaded with a "time to go-next time" count. Accordingly, after the next time count decrements to zero, another regulator calculation is made to determine a "new time to go". If, however, this new calculation is not ready, the time for firing the next thyristor pair defaults to "time to go minus next time". This operation is shown and described in the above cross referenced related application, U.S. Ser. No. 333,933 entitled, "Flux Feedback Firing Control For A Load Commutated Inverter". In that invention, each thyristor of the load side commutated inverter or inverter is fired at an optimum firing point prior to the peak of the next pseudo flux wave which is determined from the magnitude of the most recent peak or an average of a selected number of previous selected peaks.

Thus what has been shown and described is a motor drive system having at least four separate and distinct modes of operation for bringing a synchronous motor up to speed with transitioning between the various modes being determined primarily by the amplitude, balance and frequency of the pseudo-flux waves.

While that just described represents the preferred embodiment of the present invention and is that included in the appended program listing, one apparent modification which can be made and which will provide satisfactory results in certain applications where only light torque at low speeds is required (e.g., certain fan and pump applications) is as follows. In this modification the third mode of operation (i.e., the second forced commutation mode) is eliminated and the second mode (first forced commutation mode) is modified. Here, the frequency of the load side converter is varied on a time basis from the $\sqrt{T/J}$ value to some predetermined fixed value. Typically, this fixed value would be in the range of from five (5) to fifteen (15) percent of rated motor frequency. Upon reaching this fixed value, transition would then be made directly to the fourth or self-commutation mode earlier described.

While there has been shown and described what are at present considered to be the preferred embodiments of the invention, modifications thereto will readily occur to those skilled in the art. It is not desired, therefore, that the invention be limited to the specific methods and logic structure shown and described, but it is intended to cover all such modifications, changes and alterations as fall within the true spirit and scope of the invention as defined in the appended claims.

What is claimed is:

1. A method of controlling an AC motor over its operating range by means of a source side converter coupled from an AC source to a load side converter by way of a DC link circuit wherein the load side converter is operable in multiple operational modes to control the AC motor, comprising the steps of:
    (a) maintaining said load side converter in an idle mode of operation when said motor is in an at-rest state or in a coasting operating state;
    (b) sequentially transitioning said load side converter when said motor is initially in the at-rest state;
        (1) from said idle mode to a first type forced commutation mode of operation, by causing current in the DC link circuit to be substantially zero, to initiate operation of said motor load from the at-rest state, and
        (2) from said first type forced commutation mode to a second type forced commutation mode of operation following initiation of operation of said motor, and,
        (3) from said second type forced commutation mode of operation to a self-commutation mode of operation when a predetermined operating state of said motor exists, and
    (c) selectively transitioning said load side converter from said idle mode when said motor is in the coasting operating state to a one of said second forced commutation mode of operation and said self-commutation mode of operation as a function of prescribed values of motor speed.

2. The method as defined in claim 1 wherein the selective transitioning of said load side converter from the idle mode to the second forced commutation mode occurs when said motor is coasting at rotational speeds of up to the approximate range of five percent to ten percent of motor rated speed and wherein the selective transitioning of said load side converter from the idle mode to the self-commutation mode occurs when said motor is coasting at higher rotational speeds than said approximate range.

3. A method of controlling an AC motor load over its operating range by means of a source side converter coupled from an AC souirce to a load side converter by a DC link circuit wherein the load side converter is operable in multiple operational modes to control said load, comprising the steps of:
    (a) maintaining said load side converter in an idle mode of operation during an at rest state or a coasting operating state of said load;
    (b) transitioning said load side converter from said idle mode to a first type forced commutation mode of operation, by causing current in the DC link circuit to be substantially zero, to initiate operation of said load from said idle mode;
    (c) transitioning said load side converter from said first type forced commutation mode to a second type forced commutation mode of operation following initiation of operation of said load until another predetermined operating state of said load exists; and
    (d) transitioning said load side converter from said second type forced commutation mode of operation to a self-commutation mode of operation when said another predetermined operating state of said load exists.

4. The method as defined by claim 3 and additionally including the step of:
(e) selectively transitioning to said idle mode from said self-commutation mode and any of said two types of forced commutation modes, as well as transitioning to said second type of forced commutation mode from said self-commutation mode and transitioning to said first type of forced commutation mode from said second type of forced commutation mode for prescribed changes of operating states of said load.

5. A method of controlling an AC load over its operating range by means of a source side converter coupled from an AC source to a load side converter by a DC link circuit and wherein the load side converter comprises a thyristor converter operable in a plurality of operational modes to supply power to said AC load, comprising the steps of:
(a) maintaining the load side converter in an idle mode wherein thyristors in said converter remain inoperative during a predetermined operating state of said load;
(b) transitioning said load side converter from said idle mode to a first type forced commutation mode of thyristor operation, by causing current in the DC link circuit to be substantially zero, to initiate a start-up operation of said load;
(c) transitioning said load side converter from said first type forced commutation mode to a second type forced commutation mode of thyristor operation following start-up until another predetermined operating state of said load exists; and
(d) transitioning said load side converter from said second type forced commutation mode to a self-commutation mode of thyristor operation when said another predetermined operating state of said load exists.

6. The method as defined by claim 5 and additionally including the step of:
(e) transitioning said load side converter to said idle mode selectively from the self-commutation mode and the first and second type of forced commutation mode depending upon a change in the existing operating state of said load and the particular operating mode of thyristor operation at the time of change in operating state.

7. The method as defined in claim 5 and additionally including the step of:
(e) transitioning to said second type of forced commutation mode of thyristor operation from said self-commutation mode upon a change in the operating state of said load.

8. The method as defined by claim 5 and additionally including the step of:
(e) transitioning from said second type of forced commutation type of thyristor operation to said first type of commutation mode upon a change in the operating state of said load.

9. The method as defined by claim 5 and additionally including the step of:
(e) transitioning from said first type forced commutation type of thyristor operation to said idle mode upon a change in the operating state of said load.

10. The method as defined by claim 5 and additionally including the step of:
(e) selectively transitioning upon a particular change in the operating state of said load to the idle mode from the self-commutation mode or either of the two types of forced commutation modes, transitioning to the second type of forced commutation mode from the self-commutation mode, or transitioning to the first type of forced commutation mode from said second type of forced commutation mode.

11. The method as defined by claim 5 wherein said load comprises an AC motor.

12. The method of controlling a synchronous motor over its speed range by means of a source side converter coupled from an AC source to a load side converter by a DC link circuit and wherein the load side converter comprises a converter having selectively fired thyristors for supplying power to said synchronous motor, comprising the steps of:
(a) operating said load side converter in an idle mode wherein said thyristors in said converter remain in an unfired operating state;
(b) transitioning said load side converter from said idle mode to a first type forced commutation mode of thyristor operation, by causing current in the DC link circuit to be substantially zero, at start up to initiate operation of said motor from a zero spaced condition;
(c) transitioning said load side converter from said first type forced commutation mode to a second type forced commutation mode of thyristor operation upon reaching a first predetermined operating speed of said motor; and
(d) transitioning said load side converter from said second type forced commutation mode to a self-commutation mode of thyristor operation upon reaching a second predetermined operating speed of said motor.

13. The method of controlling a synchronous motor as defined by claim 12 and additionally including the step of:
(e) transitioning to said idle mode from said self-commutation mode, said second type forced commutation mode and said first type forced commutation mode on shut-down of operation of said motor; or
(f) transitioning to the immediate preceding operational mode of steps (d) through (a) depending upon a downward change in the operating speed of said motor.

14. The method as defined by claim 12 and wherein said first type forced commutation mode of thyristor operation comprises a fixed frequency forced commutation mode wherein said thyristors of said load side converter are fired at a predetermined fixed relatively low frequency.

15. The method as defined by claim 14 wherein said predetermined low frequency is proportional to the available starting torque of said motor based upon motor field current and stator current applied and the inertia of the rotor of said motor and load coupled to the rotor.

16. The method as defined by claim 14 wherein said step (b) additionally includes the step of pulsing the motor field current and determining the relative amplitudes of pseudo-flux waveforms derived from the motor back electromotive force for firing the appropriate thyristors of said load side converter to guarantee initial correct motor rotor rotation.

17. The method as defined by claim 14 and wherein said second type forced commutation mode of thyristor operation comprises a synchronized forced commutation mode wherein synchronizing signals for thyristor firing of the load side converter are generated from psuedo-flux waveforms derived from the back electromotive force of the motor following start up.

18. The method as defined by claim 17 wherein transitioning from said fixed frequency forced commutation mode to the synchronized forced commutation mode occurs as a function of the amplitude of said pseudo-flux waveforms.

19. The method as defined by claim 17 wherein transitioning from the fixed frequency forced commutation mode to the synchronized forced commutation mode occurs when the sum of the absolute values of the pseudo-flux waveforms exceed a predetermined value and that the three phases of the pseudo-flux waveforms are substantially balanced.

20. The method of claim 17 wherein forced commutation recited in step (b) and (c) comprises the method of decreasing the current in said DC link circuit to zero by forcing said source side converter to an inversion limit whenever any of said thyristors in said load side converter is rendered conductive.

21. The method as defined by claim 17 wherein said synchronized forced commutation mode comprises an operating state where the pseudo-flux waveforms have an amplitude sufficient for generating synchronizing signals for the firing of the load side converter thyristors but the motor speed is too low to provide pseudo-flux waveforms of sufficient amplitude for self commutation.

22. The method as defined by claim 17 wherein said synchronized forced commutation mode of operation exists in the region of below substantially 10% of rated speed of said motor and wherein transition to said self commutation mode (step d) occurs at substantially 10% of rated speed.

23. The method as defined by claim 17 wherein said step (c) includes a step of determining the phase sequence of said pseudo-flux waveforms for determining the direction of motor rotor rotation and thereafter altering the thyristor firing angle of said load side converter in the event of a wrong rotation to produce torque in the correct rotational direction.

24. The method as defined by claim 17 wherein said step (c) additionally includes the step of compensating for any phase error of the pseudo-flux waveforms at relatively low frequencies in order to maintain a substantially unity power factor operation of the load side converter in order to maintain maximum torque per ampere output of said motor.

25. The method as defined by claim 17 wherein synchronization in both the synchronized forced commutation mode and the self-commutation mode is based on zero crossings of the pseudo-flux waveforms.

26. The method as defined by claim 17 wherein synchronization in said synchronized commutation mode includes two types of synchronization, one based on the prediction of a succeeding pseudo-flux wave zero crossing in view of at least two of the immediate two previous flux wave crossings and a closed loop tracking method utilizing respective instant flux wave zero crossings for synchronization.

27. The method as defined by claim 17 wherein said synchronized forced commutation mode includes a step of going from a full motoring condition to a full braking condition by simultaneously commanding a motor current proportional to the absolute value of torque command and adjusting the load side firing angle from 180° to 0° in steps of substantially 30°.

28. The method as defined by claim 17 wherein for substantially constant torque over substantially the entire speed range of said motor, step (c) includes the step of changing the firing angles of the load side converter in increments of substantially 1° to 2°.

29. Apparatus for controlling an AC load, such as a synchronous motor, over its operating range and including a source side converter coupled from an AC source to a load side converter by a DC link circuit and wherein the load side converter is operable in a plurality of operational modes to supply power to said AC load, comprising:
(a) means for maintaining said load side converter in an idle mode of operation during an at rest or coasting operating state of said load;
(b) means for transitioning said load side converter from said idle mode to a first type forced commutation mode of operation, by causing current in the DC link circuit to be substantially zero, to initiate operation of said load from an at rest state;
(c) means for transitioning said load side converter from said first type forced commutation mode to a second type forced commutation mode of operation following initiation of operation of said load until another predetermined operating state of said load exists; and
(d) means for transitioning said load side converter from said second type forced commutation mode of operation to a self-commutation mode of operation when said another predetermined operating state of said load exists.

30. The apparatus as defined by claim 29 and additionally including:
(e) means for selectively transitioning to said idle mode from said self-commutation mode and any of said two types of forced commutation modes, as well as transitioning to said second type of forced commutation mode from said self-commutation mode and transitioning to said first type of forced commutation mode from said second type of forced commutation mode for any change of operating state of said load.

31. Apparatus for controlling an AC load over its operating range and including a source side converter coupled from an AC source to a load side converter by a DC link circuit and wherein the load side converter comprises a thyristor converter for supplying power to said AC load, comprising:
(a) means for maintaining the load side converter in an idle mode wherein thyristors in said converter remain inoperative during a predetermined operating state of said load;
(b) means for transitioning said load side converter from said idle mode to a first type forced commutation mode of thyristor operation, by causing current in the DC link circuit to be substantially zero, to initiate a start-up operation of said load;
(c) means for transitioning said load side converter from said first type forced commutation mode to a second type forced commutation mode of thyristor operation following start-up until another predetermined operating state of said load exists; and
(d) means for transitioning said load side converter from said second type forced commutation mode to a self-commutation mode of thyristor operation when said another predetermined operating state of said load exists.

32. The apparatus as defined by claim 31 and additionally including:
(e) means for transitioning said load side converter to said idle mode selectively from the self-commutation mode and the first and second type of forced commutation mode depending upon a change in the existing operating state of said load and the particular operating mode of thyristor operation at the time of change in operating state.

33. The apparatus as defined in claim 31 and additionally including:
(e) means for transitioning to said second type of forced commutation mode of thyristor operation from said self-commutation mode upon a predetermined change in the operating state of said load.

34. The apparatus as defined by claim 31 and additionally including:
(e) means for transitioning from said second type of forced commutation mode of thyristor operation to said first type of commutation mode upon a predetermined change in the operating state of said load.

35. The apparatus as defined by claim 31 and additionally including:
(e) means for transitioning from said first type forced commutation type of thyristor operation to said idle mode upon a predetermined change in the operating state of said load.

36. The apparatus as defined by claim 31 and additionally including:
(e) means for selectively transitioning, upon a particular change occurring in the operating state of said load, to either the idle mode from the self-commutation mode and any of the two types of forced commutation modes, transitioning to the second type of forced commutation mode from the self-commutation mode, or transitioning to the first type of forced commutation mode from said second type of forced commutation mode.

37. The apparatus as defined by claim 31 wherein said load comprises an AC motor.

38. The apparatus as defined by claim 37 wherein said AC motor comprises a polyphase synchronous motor.

39. The apparatus as defined by claim 37 wherein said first type forced commutation mode of thyristor operation comprises a fixed frequency forced commutation mode wherein said thyristors of said load side converter are fired at a predetermined fixed relatively low frequency.

40. The apparatus as defined by claim 39 wherein said predetermined low frequency is proportional to the available starting torque of said motor based upon motor field current and stator current applied and the inertia of the rotor of said motor and load coupled to the rotor.

41. The apparatus as defined by claim 39 and wherein said second type forced commutation mode of thyristor operation comprises a synchronized forced commutation mode wherein synchronizing signals for thyristor firing of the load side converter are generated from pseudo-flux waveforms derived from the back electromotive force of the motor following start up.

42. The apparatus as defined by claim 41 wherein transitioning from said fixed frequency forced commutation mode to said synchronized forced commutation mode occurs when the sum of the absolute values of the pseudo-flux waveforms exceed a predetermined value and the three phases of the pseudo-flux waveforms are substantially balanced.

43. The apparatus as defined by claim 41 wherein said synchronized forced commutation mode comprises an operating state where the pseudo-flux waveforms have an amplitude sufficient for generating synchronizing signals for the firing of the load side converter thyristors but the motor speed is too low to provide pseudo-flux waveforms of sufficient amplitude for self-commutation.

44. The apparatus as defined by claim 43 wherein synchronization in both the synchronized forced commutation mode and the self-commutation mode is based on zero crossings of the pseudo-flux waveforms.

45. A method of controlling an AC motor load over its operating range by means of a source side converter coupled from an AC source to a load side converter by a DC link circuit wherein the load side converter is operable in multiple operational modes to control said load, comprising the steps of:
(a) maintaining said load side converter in an idle mode of operation during an at-rest state or a coasting operating state of said load;
(b) transitioning said load side converter from said idle mode to a forced commutation mode of operation, by causing current in the DC link circuit to be substantially zero, to initiate operation of said load from said idle mode, in which the operational frequency of said load side converter is varied on a time basis to a maximum value in the range of approximately five to fifteen percent of motor rated frequency; and,
(c) transitioning said load side converter from said forced commutation mode of operation to a self-commutation mode of operation when said another predetermined operating state of said load exists.

46. A method of controlling an AC motor over its operating range by means of a source side converter coupled from an AC source to a load side converter by way of a DC link circuit wherein the load side converter is operable in multiple operational modes to control the AC motor, comprising the steps of:
(a) maintaining said load side converter in an idle mode of operation when said motor is in an at-rest state or in a coasting operating state;
(b) sequentially transitioning said load side converter when said motor is intitially in the at-rest state;
(1) from said idle mode to a forced commutation mode of operation, by causing current in the DC link circuit to be substantially zero, to initiate operation of said motor load from the at-rest state in which the operational frequency of said load side converter is varied on a time basis to a maximum value in the range of approximately five to fifteen percent of motor rated frequency, and,
(2) from said forced commutation mode of operation to a self-commutation mode of operation when a predetermined operating state of said motor exists, and,
(c) selectively transitioning said load side converter from said idle mode when said motor is in the coasting operating state to a one of said forced commutation mode of operation and said self-commutation mode of operation as a function of prescribed values of motor speed.

* * * * *